Jan. 27, 1970     M. T. GRAY     3,491,464
TEACHING SYSTEM
Filed Jan. 23, 1967     8 Sheets-Sheet 1
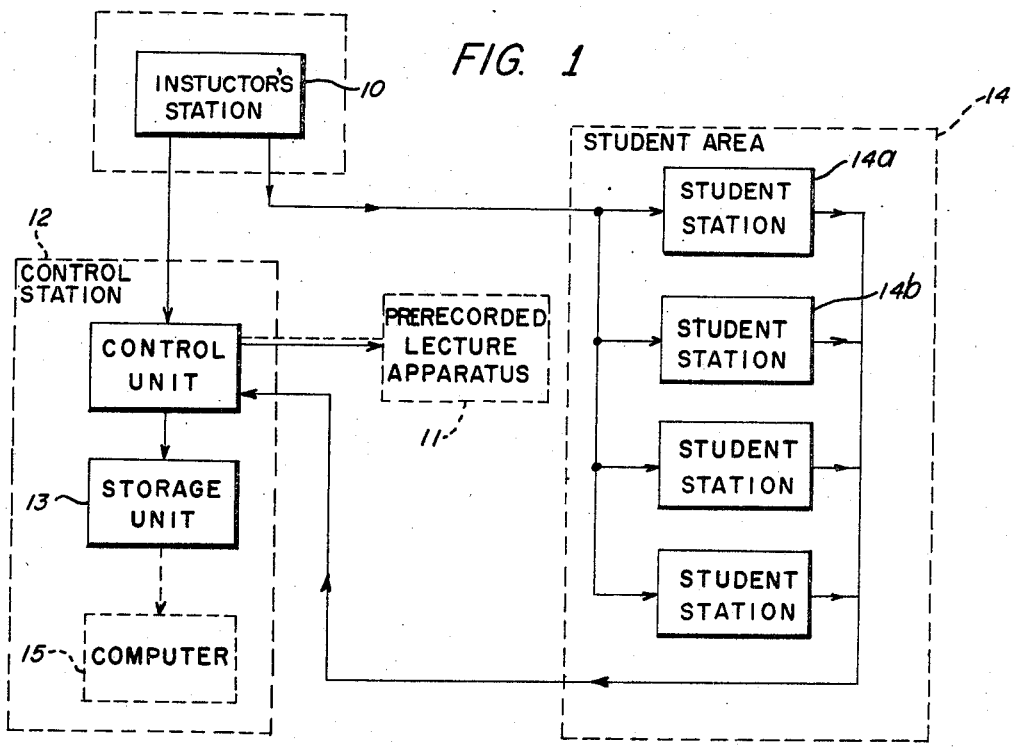
FIG. 1
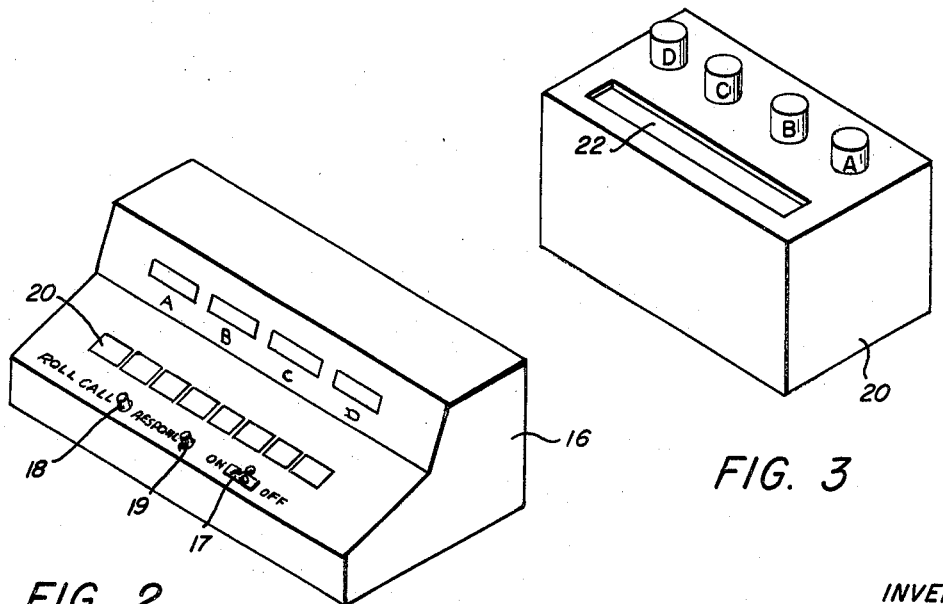
FIG 2
FIG. 3
INVENTOR
MICHAEL T. GRAY
BY Irving S. Rappaport
ATTORNEY

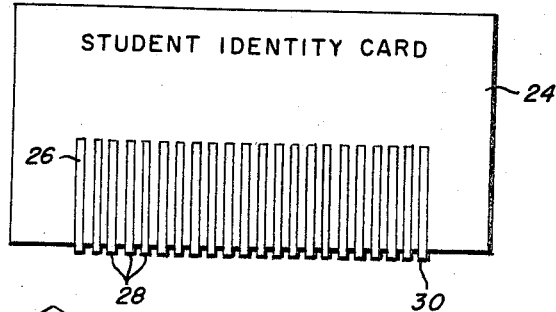
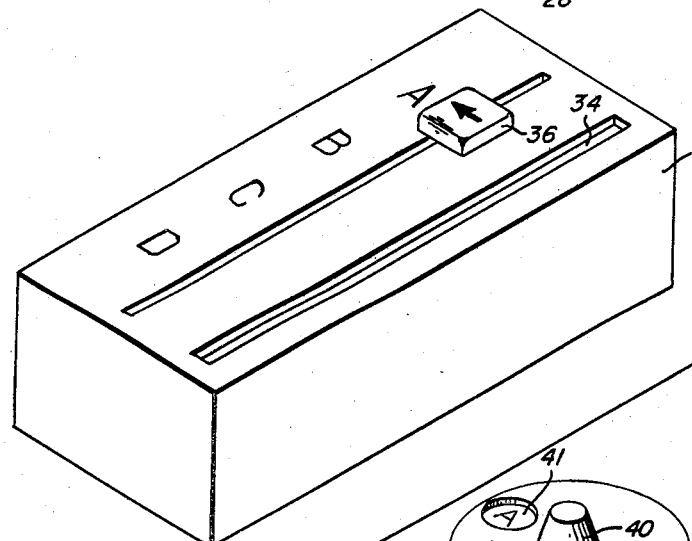
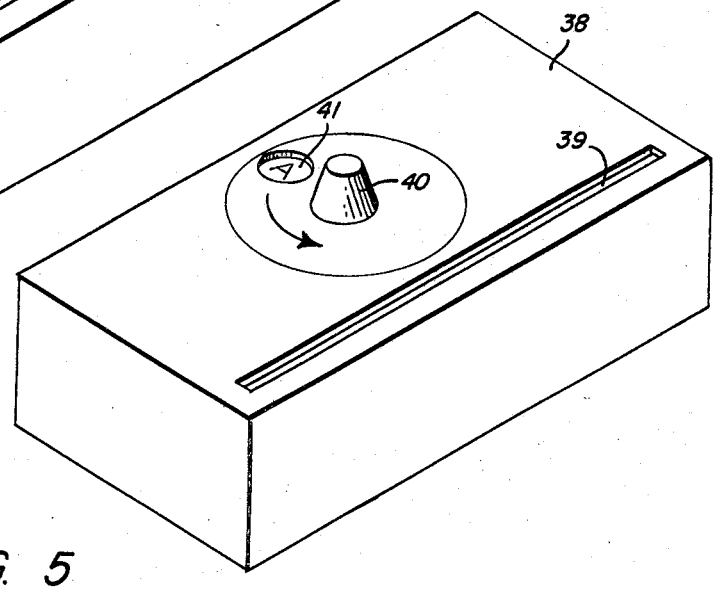

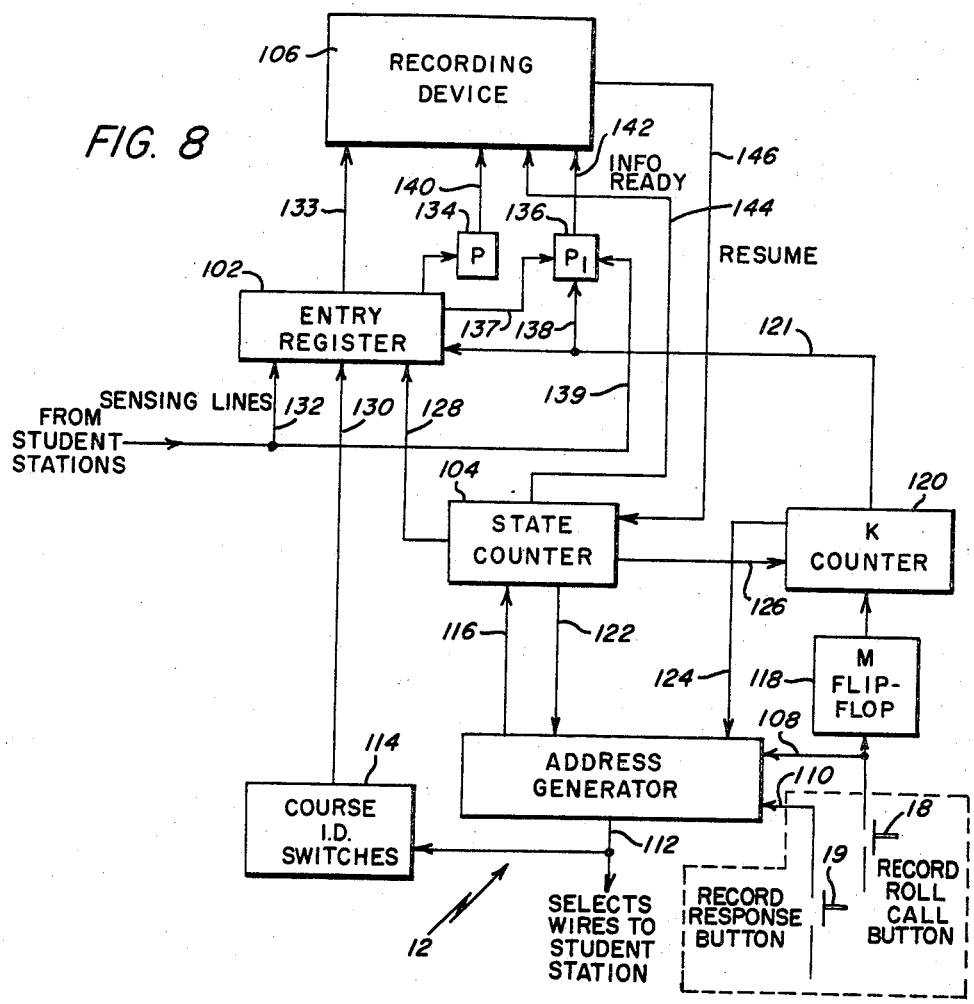
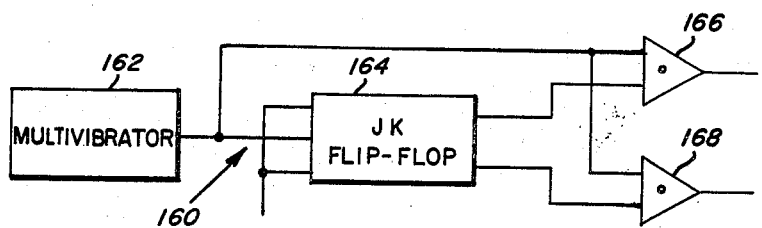

Jan. 27, 1970   M. T. GRAY   3,491,464

TEACHING SYSTEM

Filed Jan. 23, 1967   8 Sheets-Sheet 5

INVENTOR
MICHAEL T. GRAY
BY Irving S. Rappaport
ATTORNEY

INVENTOR
MICHAEL T. GRAY
BY Irving S. Rappaport
ATTORNEY

United States Patent Office 3,491,464
Patented Jan. 27, 1970

3,491,464
TEACHING SYSTEM
Michael T. Gray, Sunnyvale, Calif., assignor, by mesne assignments, to Raytheon Education Company, Lexington, Mass.
Filed Jan. 23, 1967, Ser. No. 610,929
Int. Cl. G09b 7/02
U.S. Cl. 35—48                     31 Claims

ABSTRACT OF THE DISCLOSURE

A teaching system which comprises a plurality of student response stations each including student response generating means for generating responses to questions posed to the student and means for identifying each student by a coded student identification means, an instructor's lectern for controlling and monitoring the responses from the student response stations, a control unit for controlling the identification and response operations of the system and a storage unit for storing all of the student responses from each student station.

Background of the invention

This invention relates to teaching systems and particularly to control systems for use with teaching machines in conducting classes.

In general, machines or systems for delivering audio and/or visual instructional material employ apparatus wherein the instructional material is in recorded form, generally take the form of audio material which may be synchronized with a film or slide projector. Usually such teaching machines include means for testing students to determine if the instructional material is being understood.

Known teaching machines are adapted to be controlled from a master station such as an instructor's lectern which includes means for indicating student responses. For example, an instructor, from his position at the lectern, may start the operation of the system which delivers the instructional material and at the conclusion of the delivery or at selected points during delivery may verbally or visually insert questions to be answered by the students. Student responses are achieved through the use of response devices at each student position, which devices enable the students to indicate and register a selected one of several possible responses to each question by merely operating the selected one of several switches corresponding to the several possible responses. Each response device is electrically connected to the master station so that the instructor may be made visually aware of each individual student's response.

However, it has been found that teaching machines known at the present time have several disadvantages. For example, the design of such machines has restricted use of the machines to the teaching of a very limited number of students. Thus, the machines cannot be used for the instruction of large classes such as today often number hundreds of students.

Another objection to known teaching systems is the great difficulty, if not the actual impossibility, of identifying the individual students. A further serious objection is the lack of means for recording the responses of the students and simultaneously, if desired, automatically grading the individual students and recording the grades along with the recording of the responses.

Summary of the invention

The present invention overcomes the above and other objections to prior art types of teaching systems by the provision of a novel control apparatus for teaching machines which permits individual identification of any number of students.

In accordance with this invention there is also provided means for feeding all student responses to the master station for individual selected viewing by the instructor, but also means for feeding all student responses to computerized recording devices which compile a complete record of the individual student identifications and locations and all student responses and grades. Computers may thereafter be employed to provide written records of each student's performance.

The device and method employed for student identification in accordance with the present invention comprises a student identification card which is provided with means thereon for cooperating with a switch device at each student's desk. Each card is arranged in a binary coded form whereby when it operates a switch an electrical form of the code will be transmitted to a control unit which, upon closing of a "roll call" switch by the instructor, operates suitable recording means such as a tape punching device or other means for storing the student identification information. Such stored information may be fed into a computer at some later time.

Prior to a lecture, the instructor feeds into the control unit information which identifies the lecture which follows, that is, the course number, date, etc. This information is automatically recorded in the storage unit with each roll call. At the same time, the course identification information is also again recorded, thus enabling the computer to later associate the responses with the proper course or lecture. Thus, it is possible for a single control unit to be used for storing data from several courses being simultaneously presented.

With the present invention means is also provided under control of the instructor for feeding into the storage unit symbols on data relating to the numbers of each question asked the students, the number of symbol which represents the correct response, and the weight or grade which is to be credited to each student who responds by operating the correct response switch. This information may, of course, be prerecorded if the lecture or course is being presented by a prerecorded method.

More specifically the present invention provides a teaching system which comprises a plurality of student response stations each including student identification means, an instructor's lectern for controlling and monitoring the responses from the student response stations, a control unit for controlling the identification and response operations of the system and a storage unit for storing all of the student responses from each student station and a recording unit recording all the responses from each student station.

The above and other advantages and objectives of the invention will become apparent from the following descirption taken in connection with the accompanying drawings.

Brief description of the drawings

FIG. 1 is a block diagram illustrating the teaching apparatus or machine embodying this invention;

FIG. 2 is an isometric view of the instructor's station of the teaching apparatus shown in FIG. 1;

FIG. 3 shows an isometric view of a student station as shown in the teaching apparatus of FIG. 1;

FIG. 4 shows an alternative embodiment of the student station shown in FIG. 3;

FIG. 5 shows another alternative embodiment of the student station shown in FIG. 3;

FIG. 6 shows a student identity card which may be employed with the student stations shown in FIGS. 3 through 5;

FIG. 8 is a block diagram of the control unit shown in FIG. 1;

FIGS. 9 through 18 illustrate the logic circuits making up the control unit shown in block form in FIG. 8.

Description of the preferred embodiments

Figure 7:
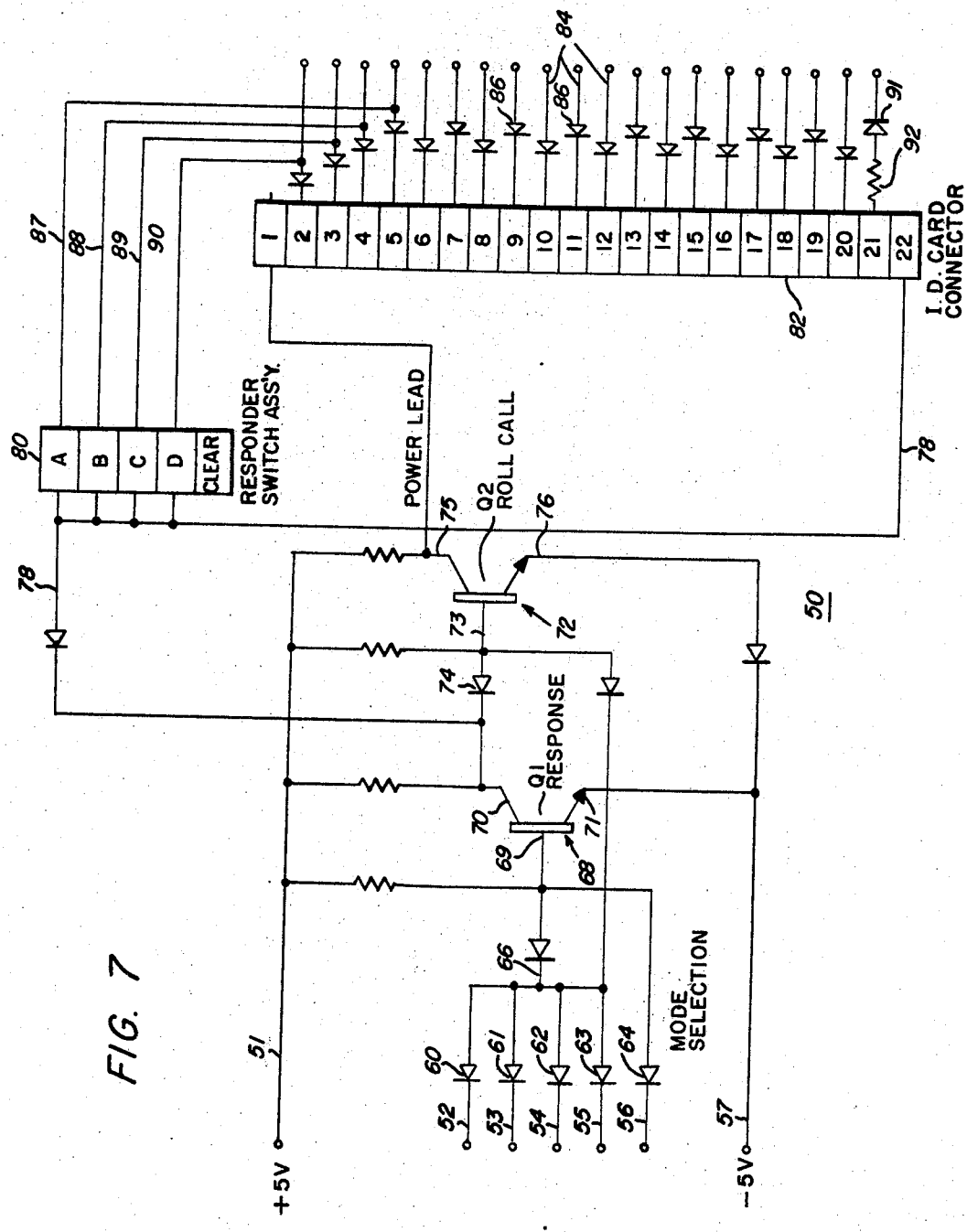
FIG. 7 shows the internal circuitry of the student stations shown in FIGS. 3 through 5.

Referring in particular to the drawing wherein like characters designate like parts throughout the several views, there is shown in FIG. 1 a general diagrammatic illustration in block form of a system embodying the invention. The system comprises primarily three distinct areas, an instructors station 10, a control station 12 and a student area 14. The system may also be combined with a storage unit 13 and a computer 15 (shown dotted). The storage unit 13 is used to store the information output obtained from the control unit 12 and the computer 15 processes the information from the storage unit 13. Also, rather than using live instruction, a prerecorded lecture may be employed by using such apparatus as the prerecorded lecture apparatus 11 shown dotted in FIG. 1.

The instructor's station, which is adapted to be located in or adjacent to a lectern for use by a professor, teacher or other type of instructor, may consist of a housing containing suitable meters, etc. to be described. The control unit 12 housing the control circuitry, to be described, and the student area 14 comprises a number of student stations 14a, 14b, etc., the number of student stations being predetermined in accordance with the number of students participating in the program. Details of the student stations will also be described hereinafter.

In order to better understand the functions of each of the component parts of the system, a typical example of the operational system will be described. In the course of a lecture, an instructor can use the equipment to monitor the response of the class to the lecture. This is done by asking questions of a multiple choice nature at various points during the lecture. The students respond to questions by selecting from the possible answers suggested, the answer which in their opinion best satisfies the question. The students indicate their choice of answer by pushing a button or activating other switching mechanisms on their student response stations. An instructor can then record the student responses in a computer compatible form, for example, on a punched tape, magnetic tape or punched card. The instructor records the response to the question by activation of a switch at the instructor's station. The activation of this switch causes the student responses to be recorded in sequence in a digital fashion on the selected recording media. The instructor can also monitor the overall response of the class by means of a set of meters on his station which indicate the percentage of students selecting each of the possible answers. Each student is equipped with the student identity card which is inserted into a slot provided at each student response station. The purpose of this card is to identify the particular student at each student response station. The instructor, at his option, may record all of the student identity numbers by means of a second control button on the instructor's control station.

Each student station is connected to a set of wires originating in the control station address generator. Each student station has a unique binary address. This address is determined by the manner in which a student station is connected to the comon wires coming from the control station address generator (refer to FIG. 8). In our preliminary version, the control station address generator consisted of twelve flipflops wired as a binary counter. The true and false sides of each flipflop are connected to a pair of wires going from the control station out to all the student stations. In other words, from the twelve flipflops in the control station address generator, twenty-four wires go out to all of the student stations. In actual practice, not all of the twenty four wires go to each student station. Instead, some of the wires are used to make grosser selections, for instance, to select one aisle from all the possible aisles in the auditorium. Then a secondary selection is made of the row within the aisle and then finally a selection is made of the seat within the row. The student station itself contains address circuitry sufficient only to identify it as a particular seat in a row. At the end of each row is a junction box containing additional circuitry to identify it as a particular row and aisle. Once again, at the end of each aisle, there is still another junction box with additional circuitry to identify it as the particular aisle out of all the possible aisles in the auditorium. Similarly, we could select one of a possible group of auditoriums in the same way. The capacity of the address generator is 4,096 student stations, which could be distributed among several auditoriums.

It is intended, in accordance with this invention, that an instructor be enabled to maintain control of the entire programing from his position at the instructor's station and to be simultaneously aware at all times of the student response from all student stations. In order to achieve this result, as shown in FIG. 2, the instructor's station may include a housing 16 which contains suitable switches and other electrical components which are interconnected with control unit 12 and with each individual student station 14. Included is a connection ON-OFF switch 17 which is intended to electrically activate the entire system, a record roll call button 18, a record response button 19, meters A, B, C and D to indicate the percentage of student responses in each of the answers and thumbwheel switches 20 for providing classroom and course identification information.

In accordance with this invention, there is provided means whereby individual students are enabled to activate their individual response units which are located at the respective student stations. Each student response unit contains a series of buttons or other switching mechanisms which can be used to indicate the operator's choice of several alternatives. One such response unit is illustrated in FIG. 3 and comprises a housing body 21 including a slot 22 in its upper surface for the purpose of receiving a student identity card therein. One type of identity card suitable for use in a system of this type is shown in FIG. 6 and comprises a rectangular sheet 24 of plastic or stiff paper or other material which carries thereon a printed circuit 26 which is coded in such a manner as to identify the individual student using the card. The card has 19 outputs 28 and one common input 30. The common line is connected to selected outputs chosen from the first 18 in such a manner as to determine a unique binary code. In this code, a connection in the common lines represent "1" and no connection represents "0." The 19th output 28 is connected or not connected to the common line so as to make the total number of the outputs connected to the common line an odd number.

The 19th output is used as a parity check for error detection purposes. For instance, if a card has been altered through wear or malicious damage so that one of the original connections was broken or a broken connection was remade, then the total number of outputs connected to the common line would no longer add up to an odd number. This would be detected as an error.

Typically, the card would be manufactured with all outputs connected to the common line. When the card was to be encoded, certain selected outputs would be disconnected from the common line by etching, cutting or other means. The card in use would be inserted into a printed circuit connector thereby connecting selected wires to a common wire in accordance with the code set into the card. An alternative version of the identity card could have notches or slots to operate spring switches within the printed circuit connector.

FIGS. 4 and 5 show alternative embodiments of the student response station shown in FIG. 3. In FIG. 4, a student response station 32 is provided having a slot 34 in the top face thereof. The slot 34 is provided to receive a student identity card as illustrated by card 24 in FIG. 6. To allow the student responding to select a given answer, a slide 36 is provided adjacent the possible choices for his answer, in this case being A, B, C and D. If the student desires to select answer A, the slide 36 is positioned adjacent the letter A on the face of the student response station 32.

FIG. 5 shows another embodiment of a student response station 38 in which there is provided in the top face thereof a slot 39 for receiving a student identity card. An answer selection knob 40 is provided on the top face of the response station 38. In the top face of the response station is an opening 41 which allows a plate 42 to be rotated in such manner so that the answer selected which is contained on a disk under the plate 42, shows through the opening 41. To select the answer A the student turns the answer selection knob 40 in the direction indicated by the arrow until the plate 42 is in such position that the letter A appears in the opening 41. In addition to the embodiments of the student response stations as shown in FIGS. 3 through 5, any number of configurations may be used.

One of the principal innovations in this new system aside from the computer compatibility lies in the use of a student identity card. In this system, each student has a student identity card which is used to activate a student response station. The use of this card makes it possible to record the student responses in such a manner that they can be associated with the student who originated the responses.

Student response system

The basic student response system consists of a number of student response stations or units 14a, b, etc. as shown in FIG. 1 containing a series of buttons or other switching mechanisms (see FIGS. 3 through 5) which can be used to indicate one of a choice of several possible answers to a question. Each student in a classroom or auditorium is equipped with one of these response units. In the course of the lecture, questions are asked to which each student responds indicating his choice of answer by pushing the appropriate button on his response station. The percentage of students choosing each one of the possible answers is then displayed on a set of meters labeled A, B, C and D. The meter outputs serve as a feedback system for the instructor to monitor the response of the class and to take appropriate action such as modifying his lecture to fit the needs as indicated by the meter readings.

The system has the capability of recording each individual student response in a computer compatible form. The information can be recorded in a variety of media. For instance, punched paper tape, magnetic tape or punched cards. In addition to recording student responses, the system makes it possible also to record student identification numbers so that the responses can be correlated with the proper students.

FIG. 7 shows a circuit diagram of the internal makeup of a student response station as is housed in a student response station such as those illustrated in FIGS. 3 through 5. A student response station circuit 50 is shown in FIG. 7 having a plurality of input selection lines 51, 52, 53, 54, 55, 56 and 57. Input line 51 has a positive DC potential applied thereto while line 57 has a negative DC potential applied thereto. Input selection lines 52 through 56 have selection diodes 60, 61, 62, 63 and 64 respectively connected thereto. Input lines 52 through 56 are connected to the appropriate combination of selection lines coming from the control unit 12. Diodes 60 through 63 are connected in parallel to a common lead 66, which is connected to a transistor 68 at its base 69. The transistor 68 has a collector 70 connected to input line 51 and an emitter 71 connected to input line 57. Input line 56 is connected to the base 69 of transistor 68 via the diode 64 which acts as a mode selection diode whose operation will be described later. The collector 70 of transistor 68 is connected to a transistor 72 via an isolation diode 74. Transistor 72 has a base 73 which is connected to the diode 74, a collector 75 and emitter 76. Connected between the collector 70 of transistor 68 and the diode 74 is a lead 78 which is connected to the four possible selections of a student responder switch assembly 80. The switch assembly 80 has five possible responses—A, B, C, D and clear. Lead 78 is connected at its other end to a student identity card connector 82 which is shown as having 22 pin connecting positions. The identity card connector 82 is designed to receive a student identity card such as identity card 24 shown in FIG. 6. The pin connectors 28 on one end of identity card 24 fit into the corresponding connecting positions on the card connector 82. Lead 78 is connected specifically to the connection position numbered 22. The collector of transistor 72 is connected to the connection position numbered 1 of the card connector 82. A line 84 is provided for each connecting position numbered 2 through 21 and is connected to each position via an isolation diode 86 which prevents the condition of any one response station from affecting the output from any other response station. Leads 87 through 90 connect each of the response selections A through D to one of the card connector 82 connection positions numbered 2 through 5. Power is supplied from the transistor 68 through the selected switch in the responder switch asembly 80 to one of the four output wires 87 through 90 which may be referred to as A, B, C and D wires. These A, B, C and D wires are common to all student response stations in a given installation. However, only the responder which has been selected by the address select lines will have any effect on what is present on the A, B, C and D wires. In other words, several responders may be in use and have different buttons pushed down but only one of these responders at a time would have any effect on the A, B, C, D wires. By looking at the A, B, C, D wires anytime, one can determine which button is being pushed in the responder switch assembly 80 of the student responder whose address is present in the control unit logic at that time.

On pin 21 of the ID card connector 82 is an input consisting of a diode 91 and a current limiting resistor 92. When the ID card is inserted, pin 21 is connected to pin 22 to supply alternate power to the responder switch assembly 80 via line 78. This input is used as part of the percentage meters indication system. By means of this input, all response stations can be activated simultaneously to provide inputs to the four percentage meters, the A, B, C, D percentage meters on the instructor's lectern shown in FIG. 2. This power will be present only when the control unit 12 is not in its scanning mode. When the control unit 12 is in its scanning mode, power will be disconnected from pin 21 so that only one response station can be activated at a time. The meter power comes in by means of the identification card so that any response stations not in use will be prevented from participating in the meter averaging readouts. In other words, if the total class enrollment were 200 and only 100 students showed up, only the response units corresponding to the 100 students present would participate in the meter outputs, thus making it unnecesary to clear all response stations at the end of each class.

The student response station circuit 50 has three basic modes of operation—a response mode, a roll call mode and a record mode. In the roll call mode when a student identity card is plugged into the card connector 82 and the circuit is energized, the mode selection diode 64 will place a negative bias on the base 69 of transistor 68 thereby causing transistor 72 to conduct providing power to the identification card connector 82.

The ID card is simply a printed circuit card coded in such a manner as to connect pin 1, the common input to some combination of output pins 2 through 20. Eighteen of these 19 outputs are used to indicate the code or identification number of the ID card. The 19th wire corresponding to pin 20 in the connector comes from a parity bit on the ID card and is used to detect errors or damaged cards.

While transistor 72 conducts, transistor 68 will be non-conductive. The coded information contained on the pin connections 28 of the identity card 24 will be contained on the lines 84 connected to the card connector 82. In this manner, the instructor can call the roll and the students in attendance as identified by their identity card 24 will be recorded and sent on lines 84.

When the instructor changes to the response mode and the circuit is energized, mode selection diode 64 will place a postive bias on the base 69 of transistor 68. This bias will cause transistor 68 to conduct while transistor 72 is non-conductive. With transistor 68 conducting, line 78 will be energized thereby allowing the answers to be selected on the responder switch assembly 80. When an answer is selected it will be carried on the selected line 87 through 90 and placed on the appropriate or corresponding line 84.

When the instructor then goes to record all the selected answers, during the record mode, the chosen answer on one of the sensing lines 84 in connection positions 2 through 5 will be sensed and readout of the student response station 50 one at a time to then be stored and recorded and ultimately processed by a computer.

Control unit

A key part of the system is the conrtol unit 12. The function of the control unit 12 is to select each student response station 14 in turn, sample the selected response which is temporarily contained on that response station and store that response until it can be recorded by an external recording device. As each response is recorded, the control unit is allowed to advance and select the next student response station 14. Each student station 14 is connected to a set of wires originating in the control unit at an address generator. Each student station has a unique binary address. This address is determined by the manner in which a student station 14 is connected to the common wires coming from the address generator. The address generator consists of 12 flipflops wired as a binary counter. The true and false side of each flip-flop are connected to a pair of wires going from the control unit to all student stations. In other words, from the 12 flipflops in the address generator, 24 wires go out to all of the student stations. In actual practice, not all of the 24 wires go to each student station. Instead, some of the wires are used to make grosser selections, for instance, to select one aisle from all the possible aisles in the auditorium. Then a secondary selection is made of the row within the aisle and then finally a selection is made of the seat within the row. The student station itself contains address circuitry sufficient only to identify it as a particular seat in a row. At the end of each row is a junction box containing additional circuitry to identify it as a particular row and aisle. Once again, at the end of each aisle, there is still another junction box with additional circuitry to identify it as the particular aisle out of all the possible aisles in the auditorium. Similarly, one of a possible group of auditoriums could be selected in the same way. The capacity of the address generator is 4,096 student stations, which could be distributed among several auditoriums.

FIG. 8 shows a block diagram of the control unit 12 of the present invention. The control unit 12 is made up of four major sections—an address generator 100, an entry register 102, a state counter 104, and a master clock which is not shown. The address generator 100 is a binary counter used to determine which student station is to be selected next. The entry register 102 is used to temporarily store the student's response until it can be recorded on an external recording device 106. The state counter 104 is used to determine what function the control unit 12 will be performing at any instant of time.

The address generator 100 has inputs 108 and 110 which are connected to the record roll call button 18 and the record response button 19 on the instructor's lectern as shown in FIG. 2. The address generator 100 is also connected to the input selection lines 52 through 56 of the student response stations 14 as indicated in FIG. 8 via the arrow 112. Also connected to the address generator 100 via the arrow 112 are the course identification switches 114 which are contained on the instructor's lectern.

The output from address generator 100 is connected to the state counter 104 via a lead 116. Connected in series between the record roll call button 18 and the entry register 102 are an M flipflop 118 and a K counter 120. Return paths between the state counter 104 and K counter 120 are made to the address generator 100 via lines 122 and 124 respectively. The output of the state counter 104 is connected to the K counter 120 via lead 126. The output from the K counter 120 is connected to the entry register 102 via lead 121.

The entry register 102 has input lines 128, 130 and 132 coming from the state counter 104, the course identification switches 114 and from the sensing lines of the student stations respectively. The output from the entry register 102 is connected to the recording device 106 via a lead 133, to a parity flipflop 134 via a lead 135 and to a secondary parity flipflop 136 via a lead 137. The secondary parity flipflop 136 is connected to the output from the K counter 120 via a lead 138 connected to lead 121 and also has an input from the sensing lines of the student stations via a lead 139. The outputs from the parity flipflops 134 and 136 are connected to the input of the recording device 106 by leads 140 and 142 respectively. The output from the state counter 104 is also connected to the input of the recording device 106 via lead 144 and a return path is provided from the recording device 106 to the state counter 104 via a lead 146.

Returning for a moment to a more detailed discussion of the selection diodes 60–64 of FIG. 7, each flipflop in the address generator 100 is in the control unit 12 has two outputs, one corresponding to a "zero" condition and the other corresponding to a "one" condition. Diode 60 will be connected either to the "zero" line from the first flipflop or the "one" line from that flipflop. Similarly diode 61 will be connected to the "zero" or "one" line from the second flipflop in the address generator 100. Diode 63 will be connected to a common line that is common to all the seats in that row. This line will originate from another diode matrix in the junction box at the end of the row. This diode matrix, which is not shown in this drawing, is the row selection matrix. The inputs to the row selection matrix will consist of one and zero outputs from the other flipflops in the address generator 100 plus a common line from still another selection matrix to identify the particular aisle being selected. This line will be common to all rows in a given aisle. This is taken a step further in the aisle selection matrices at the beginning of each aisle in which there may be still another common line common to every aisle in the selected auditorium.

The operation of the control unit 12 can best be understood through a discussion of the operation of the state counter 104. There are four states or modes of operation of the state counter 104. The first is the address generator advance state. In this state, the address generator 100 is advanced to select the next student station. After advancing the generator 100, a pause of approximately one millisecond is required to allow for dissipation of transient effects of the installation wiring. The second state is the entry state. In this state, information is entered from the selected student station into the entry register 102. The third state is the parity generation. In this state, the information in the entry register 102 is shifted through the register in such a way as to generate a parity bit. The fourth state is the record state. In this state, the control unit 12 provides an information ready signal via line 138 from the state counter 104 to the external recording device 106. It then waits until the external recording device 106 accepts the information in the register 102 and records it. The recording device 106 must then provide a resume signal via line 140 to the state counter 104 to return it to the initial state or address generator advance state.

The control unit 12 can be operated in two different modes. The student response mode and the student identification or roll call mode. In the student response mode, the student response is entered into the entry register 102 and recorded by the recording device 106. In the student identification mode, the student identification number is entered into the entry register 102 and recorded by the recording device 106. Each student response consists of three bits of information. With three bits any one of 8 possible binary numbers can be represented. Since a student has a choice of only five possible responses on the stations described in FIG. 7, A, B, C, D or no response, then three bits will be sufficient to indicate any possible choice that he is to make.

In the student identification mode, however, the situation is much different. A student identity number consists of 18 bits of information plus a 19th parity bit. The entry register 102 has a capacity of only four bits of information. Therefore, in order to record a student identity number, it must be broken up into several segments and recorded one segment at a time. Since in many cases, the information is to be processed by decimal computers, certain coding combinations are not allowed. If a binary computer were being used, any possible combination of four bits could be used in the entry register 102. However, in a decimal computer, any combination in which the most significant bit is a one, and either the next most significant bit or the one after also is a one, would be rejected. In order to maintain compatibility with decimal type computers, the student identity numbers are recorded in six 3 bit segments. In the process of recording each of these segments, the same procedures are used as in recording student responses. In other words, each segment is entered into the entry register 102, a parity bit is generated by parity bit flipflop 134 and the character complete with parity bit is then recorded by the recording device 106.

The principal difference between the student identity mode and the student response mode is in the use of the address generator 100. In the student response mode, the student address generator 100 is advanced to the next student station after each character has been recorded. In the student identity mode, on the other hand, the address generator 100 is not advanced until six separate characters have been recorded for each student station. This inhibition of the address generator 100 is accomplished through the use of the K counter 120. The K counter 120 has six distinct states. In the student response mode, the K counter 120 always remains in state one. In the student identity mode, the K counter 120 is allowed to advance one count for each character that is recorded. Whenever the K counter 120 is in any other state than state one, it will inhibit the address generator 100 from advancing. In other words, in the student identity mode, the first three bits of the 18-bit identity number are entered into the entry register 102, parity is generated by the parity flipflop 134 and the character is recorded. At this point, the K counter 120 advances one count and the state counter 104 is thereby inhibited from advancing the address generator 100 and so it simply advances to state 2 and enters the second 3 bits of the student identity number. The 6 states of the K counter 120 are used to determine which 3 three bits of the student identity number are to be entered into the entry register 102 at any time. The K counter 120 is controlled by the M flipflop or mode flipflop 118. The M flipflop is turned on when the roll call button or student identity number button 18 is pressed. The M flipflop 118 is held in the OFF position whenever the student response button 19 is pressed. Whenever the M flipflop 118 is ON, the control unit 12 is in the student identity mode and the K counter 120 is allowed to count, permitting the student identification number of the selected station to be recorded. When the M flipflop 118 is OFF, the control unit 12 is in the student response mode and will enter only the student response for each student station.

When the address generator 100 reaches the address which is one count greater than the last used student station address, a signal referred to as an "N" signal will be generated by the parity flipflop 136 which is used to inhibit the resume signal on lead 146 from the external recording device 106 from returning the state counter 104 to state one. In other words when all response or identity numbers from all student stations have been recorded, that is, the address generator 100 has reached 1 count greater than the last used student station address, the control unit 12 will stop scanning and will be inactive until either of the two control buttons—record response button 19 or record roll call button 18 is pressed. The scanning action of the control unit 12 is initiated by pushing either of these record buttons. When the record response button 19 is pressed, it will reset the address generator 100 to the "O" address and will turn the "M" flipflop 118 to the student response state. The control unit 12 will then cycle and record each student response in sequence as the address generator 100 selects each student station in turn until all responses have been recorded at which point the "N" signal will be generated as described above and the control unit 12 will have completed its operation. Similarly, when the roll call or student identity button 18 is pushed, the address generator 100 will be set to "O" but the M flipflop 118 will be set to the student identity number state and the control unit will be allowed to cycle under the influence of the K counter 120 so as to record an 18 bit identity number for each student station.

The first 16 addresses as generated by the address generator 100 are reserved for selection of a group of thumbwheel switches or other similar mechanism which are used to store course identification, date and other pertinent identifying information to specify the origin of any given record of information. These switches are represented by the course identification switches 114. During the recording of these first 16 characters of information, the K counter 120 will be held inoperable regardless of the mode of operation so that proper identifying information will be recorded for either the student response mode or the student identity mode.

Since course identification and dates are entered in decimal form, all four storage bits of the entry register 102 may be used during the course of recording any of the first 16 characters of information. The switches 114 used to enter the course identifying information are selected by the address generator 100 using a diode matrix technique similar to those used in selecting the student stations. This method of diode recognition of states of the address generator 100 is common computer design practice.

After each character is entered into the entry register 102, it is shifted in a recirculating manner through the 4 bit positions of the entry register 102 four places so that the charcter ends up in the entry register 102 in the same position in which it was originally entered. During the process of shifting through the entry register 102, a flip-flop labeled the "P" or parity flip-flop 134 is counted 1 count each time a one appears in the last bit position of the entry register 102. The circuit is designed in such a manner as to always start the "P" flip-flop 134 in the one condition. Since the "P" flip-flop is to be counted one count each time a one appears in the last bit of the entry register 102, the "P" flip-flop 134 will end up after the four stages of shifting in a "1" state if there are an even number of "1's" in the character started in the entry register 102 or at the "0" state if there are an odd number of "1's" in the entry register 102. This is standard practice for serial generation of parity bits.

In addition to the normal generating of a parity bit for each character, a special parity bit is generated for each student identity number. A secondary parity flip-flop 136 labeled "$P_1$" is counted in the same manner as the "P" flip-flop 134 that is one count each time a one appears in the last bit position of the entry register 102. However, the $P_1$ count is maintained over a period of six character entries. This is done once again by means of the K counter 120. The $P_1$ flip-flop 136 is reset in the beginning of the entry of a character into the entry register 102 only when the K counter 120 is in the first state receptive to the first entry of a segment of a six segment identity number. Since the "$P_1$" flip-flop maintains its count under a six character entry period, it generates a single parity bit for an entire student identity number. Referring back to the section describing the student identity card, a 19th bit or parity bit is generated in the "P" flip-flop 136 for the entire student identity number. If the bit on the student identity card fails to agree with the bit generated in the "P," flip-flop 136, then a parity error exists and either the student identity card has been damaged or a malfunction exists in the wiring and/or circuitry of the particular student station. The student identity number will be recorded in the normal manner even if a parity error exists. However, in the event of a parity error, as the last segment of an identity number is recorded, there will be recorded an additional bit as an error identity. This enables the computer which will ultimately record and analyze the information to detect this particular student identity number as being in error.

The following is a detailed description of the circuitry in the control unit 12 of FIG. 8. All circuitry used in the control unit is of the integrated circuit variety with the exception of the power supplies which are of standard design. Two kinds of integrated circuits are used: The J. K. Flip-flop and the "Nor Gate." Before proceeding further, a few definitions regarding the use of the "Nor Gate" are required. The "Nor Gates" will be treated as "And Gates" for low or negative inputs and as "Or Gates" for high or positive inputs. The output from the "Nor Gate," when treated in the "And" configuration, will be high or positive when all inputs are low, and the output for the "Nor Gate" when treated as an "Or Gate" will be low or negative when any one of the inputs is high or positive. Although the operation of a J. K. Flip-flop is well described in the literature, a brief discussion may help at this point. The J. K. Flip-flop has four inputs and two outputs. The four inputs are a set gate, a reset gate, a preset input and a clock input. The two outputs are the true and false, or one and zero outputs. The operation of the J. K. Flip-flop can be seen in the following truth table.

|  |  |  | Set | Reset | Condition after clock pulse | |
|---|---|---|---|---|---|---|
|  |  |  |  |  | JK | $\overline{JK}$ |
| Preset— | | —JK | HI | HI | JK | $\overline{JK}$ |
| Set— | | | LO | HI | LO | HI |
| Clock— | JK | T | HI | LO | HI | LO |
| Reset— | | —$\overline{JK}$ | LO | LO | JK | JK |

Hi on Preset makes $\overline{JK}$ output Hi and JK Lo. The designation of the outputs however, is arbitrary so that the Preset input can be used either to set or reset the flip-flop depending on the choice of labeling the outputs.

The operation of the control unit circuitry will be described in terms of logical equations. This is a standard method of describing the operation of electronic circuitry and is well covered in the literature. See, for instance, "Logical Design of Digital Computers" by Phister, or "Computer Design Fundamentals" by Chu. Returning now to the operation of the control unit itself, the unit 12 is made up of four principal parts: the address generator 100, the entry register 102, the state counter 104, and the master clock (not shown in FIG. 8).

Master clock

The master clock 160 shown in FIG. 9 is made up of 200 kc. multivibrator 162, a flip-flop 164 and two Nor Gates 166 and 168. The Master Clock 160 alternately produces two clock outputs—$\phi_1$ from the Nor Gate 166 and $\phi_2$ from Nor Gate 168. Outputs $\phi_1$ and $\phi_2$ are represented by the equations:

$$\phi_1 = CL.MV \quad (1) \qquad \phi_2 = CL.\overline{MV} \quad (2)$$

where CL is the "1" output from the JK flip-flop, $\overline{CL}$ is the "0" output from the JK flip-flop, and MV is the output from the multivibrator. These clock pulses are used throughout the control unit and will be referred to again.

State counter

Figure 10:
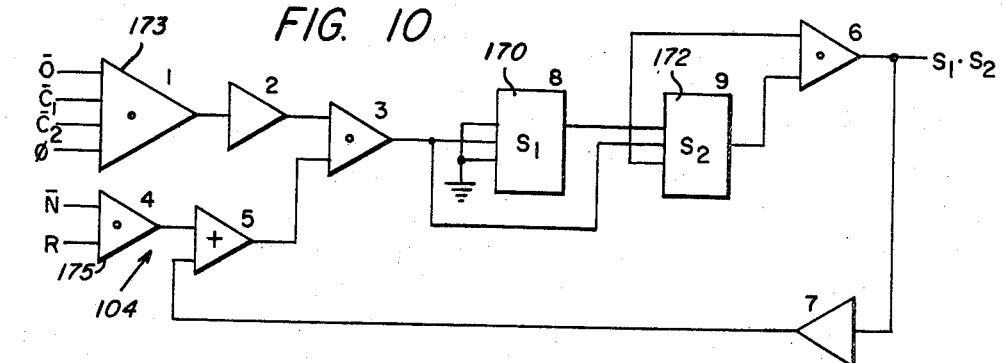
Figure 15:
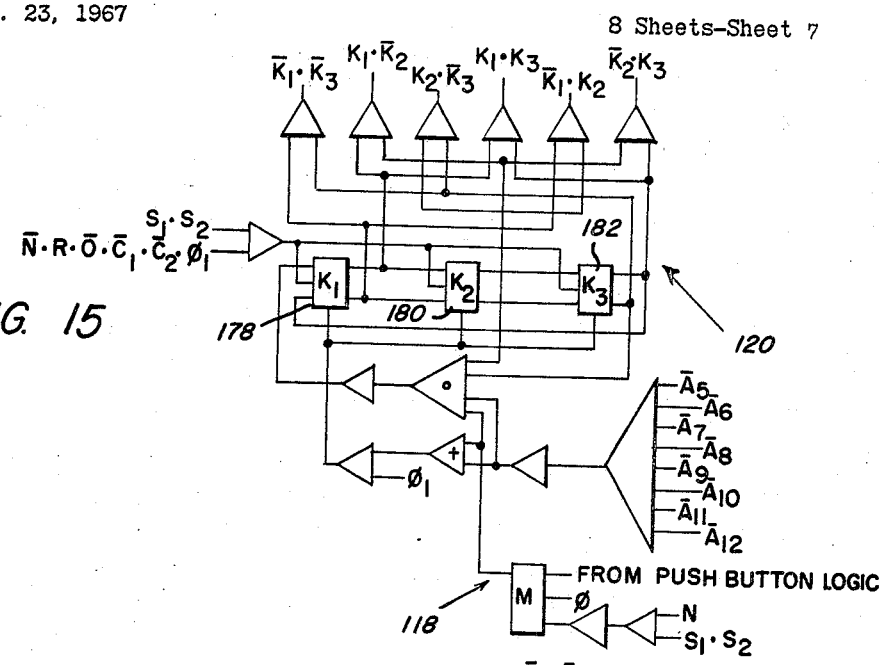

The state counter 104 is made up of two principal flip-flops 170 and 172 labeled $S_1$ and $S_2$ respectively in FIG. 10 and three subsidiary flip-flops 178, 180 and 182 labeled $K_1$, $K_2$ and $K_3$ respectively in FIG. 15 which make up the K counter 120. Referring first of all to the flip-flops $S_1$ and $S_2$, FIG. 10 shows the inputs and outputs of the $S_1$ and $S_2$ flip-flop portion of the state counter 104. Equations 3 and 4 represent the operations of the flip-flops $S_1$ and $S_2$ respectively.

$$tS_1 = \overline{O}.\overline{C}_1.\overline{C}_2.\phi_1.(\overline{N}.R + \overline{S}_1 + \overline{S}_2) \quad (3)$$

$$tS_2 = \overline{O}.\overline{C}_1.\overline{C}_2.\phi_1.(\overline{N}.R + \overline{S}_1 + \overline{S}_2).S_1 \quad (4)$$

The state counter 104, made up of Flip-flops $S_1$ and $S_2$, has four possible states: $\overline{S}_1 \overline{S}_2$, $S_1 \overline{S}_2$, $\overline{S}_1 S_2$, and $S_1 S_2$. These states are defined as follows:

In the initial $\overline{S}_1 \overline{S}_2$, the system advances the address generator 100 to select the next student station to be sampled. It then pauses for approximately one millisecond to allow transient effects in the installation wiring to dissipate. This waiting period is determined by a one shot multivibrator not shown in FIG. 10 but which supplies the input $\overline{O}$ to the NOR Gate 173 shown in FIG. 10. This term $\overline{O}$ is true when the one shot is off. In other words, it is true at all times except during the one millisecond waiting period, during which the lines are allowed to stabilize before sampling the student station.

In the next state, $S_1 \overline{S}_2$, the information from the selected student station is entered into the entry register 102. In the next state, $\overline{S}_1 S_2$, the information in the entry register 102 is shifted through the register in such a way as to generate a parity bit. There are two flip-flops 184 and 186 labeled $C_1$ and $C_2$ (once again not shown in FIG. 10 but shown in FIG. 12) which are used to count how many places the information has shifted through the entry register 102. When the information has shifted all the way around back to its original position, the two flip-flops $C_1$ and $C_2$ will be in the state $\overline{C}_1 \overline{C}_2$. These signals $\overline{C}_1$ and $\overline{C}_2$ are also inputs to the Nor Gate 173 in FIG. 10.

In the next state of the state counter 104, $S_1 S_2$, the state counter 104 waits to permit the external recording device 106 to accept the information from the entry register 102 and record it. The external recording device 106, after it has accepted and recorded the information, generates a signal on lead 146 in FIG. 8 called the "R"

signal or "Resume" signal. "R" is seen in FIG. 10 as an input to the Nor Gate 175 and this "R" signal is used to enable the state counter 104 to get out of state $S_1 S_2$ and return to the initial state $\overline{S}_1 \overline{S}_2$ to start the cycle all over again for the next student station. In FIG. 10, the output signal labeled $S_1.S_2$ is used to alert the external recording device 106 via lead 144 in FIG. 8 to the fact that information in the entry register 102 is now ready to be recorded. There is one other signal input to Nor Gate 175 which is labeled "$\overline{N}$." This signal is generated by the address generator 100 and is used to indicate that all student stations in the auditorium have been sampled and their responses recorded. "N" is true whenever all student stations have been recorded. "$\overline{N}$" is true whenever the control unit is in the middle of its scanning operation.

In Equation 3, the expression "$tS_1$" is used to indicate the conditions necessary to cause flip-flop $S_1$ to change state. In other words, if it is in the true or $S_1$ condition, it will go to the false or $\overline{S}_1$ condition. If, on the other hand, it is in the false or $\overline{S}_1$ condition, it will go to the true or $S_1$ condition. The similar expression "$tS_2$" in Equation 4 is used in the same way. Equation 3 can be interpreted as follows: change the state of $S_1$ on any $\phi_1$ clock pulse provided that the one shot is not on ($\overline{O}$); that is, not waiting for line stabilization, and the entry register 102 is shifted to its initial position as indicated by $\overline{C}_1 \overline{C}_2$, and also the system is not waiting for a resume signal from the external recording device 106, i.e., not in state $S_1 S_2$ with no "R" signal, and is still in the scanning process; that is, has not scanned through all of the student stations. This is indicated by the $\overline{N}$ signal.

Equation 4 for $S_2$ which is similar to that for $S_1.S_2$ will change state on every $\phi_1$ clock pulse under the same conditions as necessary to change $S_1$, provided that, in addition, $S_1$ is also true.

Address generator

Figures 11, 11A:
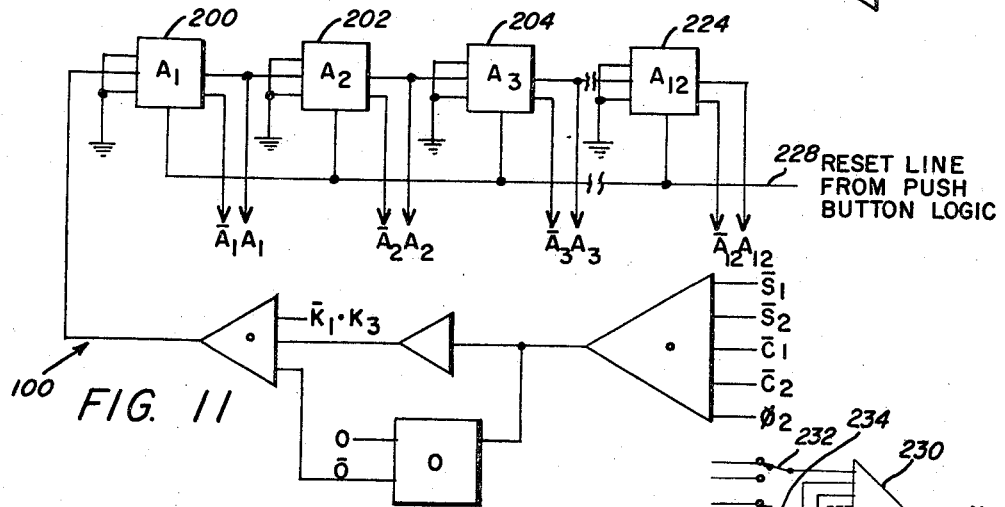

The address generator 100 is shown in FIG. 11. The address generator 100 is made up of flip-flops 200, 202, 204, etc. labeled $A_1$, $A_2$, $A_3$, etc. up through $A_{12}$, although more or less flip-flops could be used. These flip-flops are wired as a binary counter with each flip-flop triggering on the transition from the true state to the false state of the preceding flip-flop. In other words, when $A_1$ goes from state $A_1$ to $\overline{A}_1$, then flip-flop $A_2$, will change state. Similarly, when flip-flop $A_2$ goes from state $A_2$ to state $\overline{A}_2$, then flip-flop $A_3$ will change state. Filp-flop $A_1$ will be triggered or caused to change state according to the following equation:

$$tA = \overline{O}.\overline{S}_1.\overline{S}_2.\overline{C}_1.\overline{C}_2.\overline{K}_1.\overline{K}_2.\phi_2 \qquad (5)$$

In this equation, where the term "$\overline{O}$" refers to the one millisecond one shot multivibrator 226, "$\overline{O}$" will be true when the one shot 226 is off, as explained previously. $\overline{S}_1 \overline{S}_2$, in the triggering Equation 5 for $A_1$, refers to the $S_1$ and $S_2$ flip-flops 170 and 172 in the state counter 104 (see FIG. 10). In other words, to trigger $A_1$, in addition to having the one shot 226 off, the state counter 104 must be in the state $\overline{S}_1 \overline{S}_2$. Next in the equation are the terms $\overline{C}_1 \overline{C}_2$. These come from $C_1$ and $C_2$ flip-flops 184 and 186 in FIG. 12 which are used to count shifting in the entry register 102. The address generator 100 can be advanced only when the entry register 102 has been shifted around to its starting point as determined by flip-flops $C_1$ and $C_2$. This, of course, will be discussed in greater detail in the description of the entry register 102.

Next in the Equation 5 are the terms $\overline{K}_1 \overline{K}_3$. These come from the $K_1$ and $K_3$ flip-flops 178 and 182 in FIG. 15 in the subsidiary K counter 120 portion of the state counter 104. The K flip-flops 178, 180 and 182 shown in FIG. 15 are used in the record identification mode. In this mode, the student identity numbers are recorded and, as discussed in the section on the overall operation of the system, each student identity number is made up of six separate characters which must be recorded. The K flip-flops 178, 180 and 182 are used to prevent the address generator 100 from advancing until all six characters have been recorded. When the sixth character has been recorded, the K flip-flops 178, 180 and 182 will return to state $\overline{K}_1 \overline{K}_3$. This term is seen in the Equation 5 for triggering "$A_1$" as mentioned above. The last term in the triggering Equation 5 for $A_1$ is the clock pulse itself, the $\phi_2$ clock.

Equation 6 is for the one millisecond one shot 226.

$$tO = \overline{S}_1.\overline{S}_2.\overline{C}_1.\overline{C}_2.\phi_2 \qquad (6)$$

The conditions necessary for triggering this one shot 226 with a $\phi_2$ clock are that the state counter 104 must be in the initial state or the address generator 100 advance state $\overline{S}_1 \overline{S}_2$, and the entry register 102 must be in its initial state as indicated by $\overline{C}_1 \overline{C}_2$. The action proceeds as follows. When the state counter 104 returns to state $\overline{S}_1 \overline{S}_2$ and when the entry register 102 has reached its initial state $\overline{C}_1 \overline{C}_2$, the address generator 100 will advance on the next $\phi_2$ clock pulse and, at the same time, the one millisecond one shot 226 will be triggered. During the firing time of the one shot 226, the address generator 100 will be inhibited from advancing further by the $\overline{O}$ term in the $A_1$ triggering Equation 5. When the one shot 226 is fired, "$\overline{O}$" is not true and so the succeeding $\phi_2$ clock pulses will be inhibited from doing anything at all to the address generator 100. The address generator 100 will remain in its most recently selected state until the end of the one shot period. Immediately after the one shot 226 completes its cycle, the state counter 104 will advance out of $\overline{S}_1 \overline{S}_2$. This will further inhibit the address generator 100 from advancing. No further advance can be made until the state counter 104 returns to $\overline{S}_1 \overline{S}_2$.

In FIG. 11A is the "N" signal. This "N" signal is generated by a 12 input "And Gate" 230 connected by means of switches 232, 234, 236, etc. to a selected combination of the true or false sides of the 12 address generator flipflops $A_1$ $A_2$ $A_3$, etc. The switches 232, 234, 236, etc, are set to correspond to the address of the last used student station so that N will be true when the address generator 100 contains that last address and $\overline{N}$ will be true at all other times. The N signal is used to indicate the completion of the scanning cycle, i.e., all of the student stations have been sampled. The $\overline{N}$ signal conversely indicates that the system is in the middle of a scanning cycle and has not yet scanned all the student stations. The $\overline{N}$ signal is used in the logic for the state counter 104, as discussed previously, to permit the state counter 104 to advance on receipt of a resume signal on lead 146 from the external recording device 106.

At the end of a complete scanning cycle, when all student stations have been scanned and their responses recorded, the address generator 100 will reach a state corresponding to the position of the switches 232, 234, 236, etc. on the inputs of the gate generating the N signal. At this point the address generator 100 will contain an address corresponding to that of the last active student station. The N signal output from the N gate will then go true; conversely the $\overline{N}$ signal will go false, and the state counter 104 will be inhibited from advancing and will remain hung up in the $S_1 S_2$ state until the beginning of another scanning cycle. There is a line labeled "Reset Line" 228 which goes to each of the flip-flops $A_1$ through $A_{12}$ in the address generator 100. This reset line 228 originates at a push button circuit including the record roll call button 18 and the record response button 19 in FIG. 8 in the instructor's station or lectern control unit 10. When a signal is applied to the reset line 228, it will cause all the flip-flops $A_1$ through $A_{12}$ to be reset to the initial condition, thus getting the address generator 100 out of the N state. Since the whole action of the system is dependent upon the cycling of the state counter 104, and since the state counter 104 will be inhibited when the address generator 100 has reached the N count, all that is necessary to initiate a scan cycle is to take the address generator 100 out of the N state by resetting it to the all zero state.

Entry register

Figure 12:
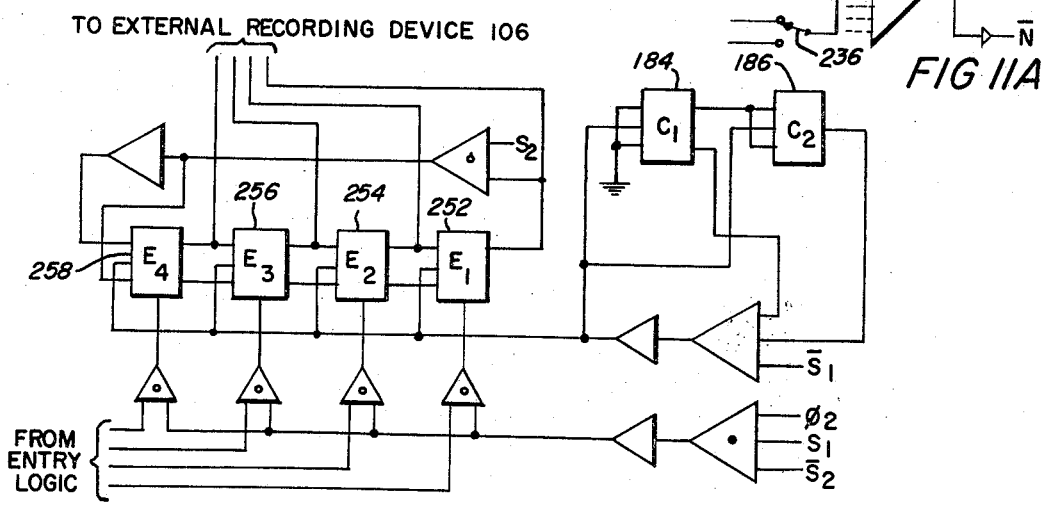

The entry register 102 can be divided into three major parts: and "E" register, which is a recirculating shift register, entry logic circuits and parity logic circuits. The "E" register portion of the entry register 102 is shown in FIG. 12.

The E register 250 is used as buffer storage for information until it can be recorded by the external recording device 106. Information is entered into the four flip-flops 252, 254, 256 and 258 of the E register 250 from the entry logic. The information is set into the E register 250 through the flip-flop preset inputs as described earlier in the discussion of the J. K. flip-flops. The information is entered into the E register 250 with a $\phi_2$ clock pulse when the state counter 104 is in the state $S_1 S_2$. Equation 7 is the entry clock—

$$\text{Entry Clock} = S_1.\overline{S}_2.\phi_2 \qquad (7)$$

After the information from the entry logic has been entered into the E register 250, the state counter 104 then advances to state $\overline{S}_1 S_2$. In this state, the E register 250 is operated in the shift mode as shown in Equation 8.

$$\text{Shift Clock} = (C_1 + C_2 + \overline{S}_1).\phi_2 \qquad (8)$$

The information is shifted through the E register 250 on every $\phi_2$ clock pulse subject to the following additional conditions. The state counter 104 must be in state $\overline{S}_1 S_2$ or the C counter made up of flip-flops 184 and 186 must be in any state other than $\overline{C}_1 \overline{C}_2$. In other words, the information will be shifted through the E register 250 on $\phi_2$ clock pulses when the state counter 104 is in the shift state ($\overline{S}_1 S_2$) or the address generator advance state $\overline{S}_1 \overline{S}_2$ or whenever the C counter indicates that a shifting cycle is incomplete. A complete shift cycle consists of four shift pulses. The C counter, made up of the $C_1$ and $C_2$ flip-flops 184 and 186, is used to count the shift pulses. At the first shift pulse, the C counter is advanced from state $\overline{C}_1 \overline{C}_2$ into state $C_1 \overline{C}_2$. At the fourth shift pulse, the C counter will be returned to its original state $\overline{C}_1 \overline{C}_2$. The C counter is a simple binary counter. The operation of the $C_1$ and $C_2$ flip-flops is given in Equations 9 and 10:

$$tC_1 = (C_1 + C_2 + \overline{S}_1).\phi_2 \qquad (9)$$

$$tC_1 = (C_1 + C_2 + \overline{S}_1).\phi_2.C_1 \qquad (10)$$

The E register 250 equations are as follows:

$$SE_4 = S_2.E_1(C_1 + C_2 + \overline{S}_1).\phi_2 + ENTRY.S_1.\overline{S}_1.\phi_2 \qquad (11)$$

$$RE_4 = (S_2.\overline{E}_1 + \overline{S}_2).(C_1 + C_2 + \overline{S}_1).\phi_2 \qquad (12)$$

$$SE_3 = E_4.(C_1 + C_2 + \overline{S}_1).\phi_2 + ENTRY.S_1.\overline{S}_2.\phi_2 \qquad (13)$$

$$RE_3 = \overline{E}_4.(C_1 + C_2 + \overline{S}_1).\phi_2 \qquad (14)$$

According to the E register equations, the $E_4$ flip-flop 258 is set to the state of the $E_1$ flip-flop 252 on every shift clock provided that the $S_2$ flip-flop 172 of FIG. 10 is true. In other words, the contents of the $E_1$ flip-flop 252 are shifted into the $E_4$ flip-flop 258 when the state counter 104 is in state $\overline{S}_1 S_2$. When the state counter 104 is in state $\overline{S}_1 \overline{S}_2$, the address generator advanced state, on the other hand, the shift pulses do not shift the contents of the flip-flop 252 into the $E_4$ flip-flop 258 but, rather, shift zeros into the $E_4$ flip-flop 258 regardless of the state of the $E_1$ flip-flop 252. As discussed in a previous section, a one millisecond one shot multivibrator 230 in FIG. 11 is fired during the advance address generator state. During this time, the E register 250 is allowed to shift in order to clear out the information that was previously entered. At the conclusion of the one shot cycle, the C counter continues to inhibit both the address generator 100 from advancing and the state counter 104 from advancing until the C counter reaches state $\overline{C}_1 \overline{C}_2$. At this point, the E register 250 has been completely cleared of old information and is ready to accept new information.

Figure 13:
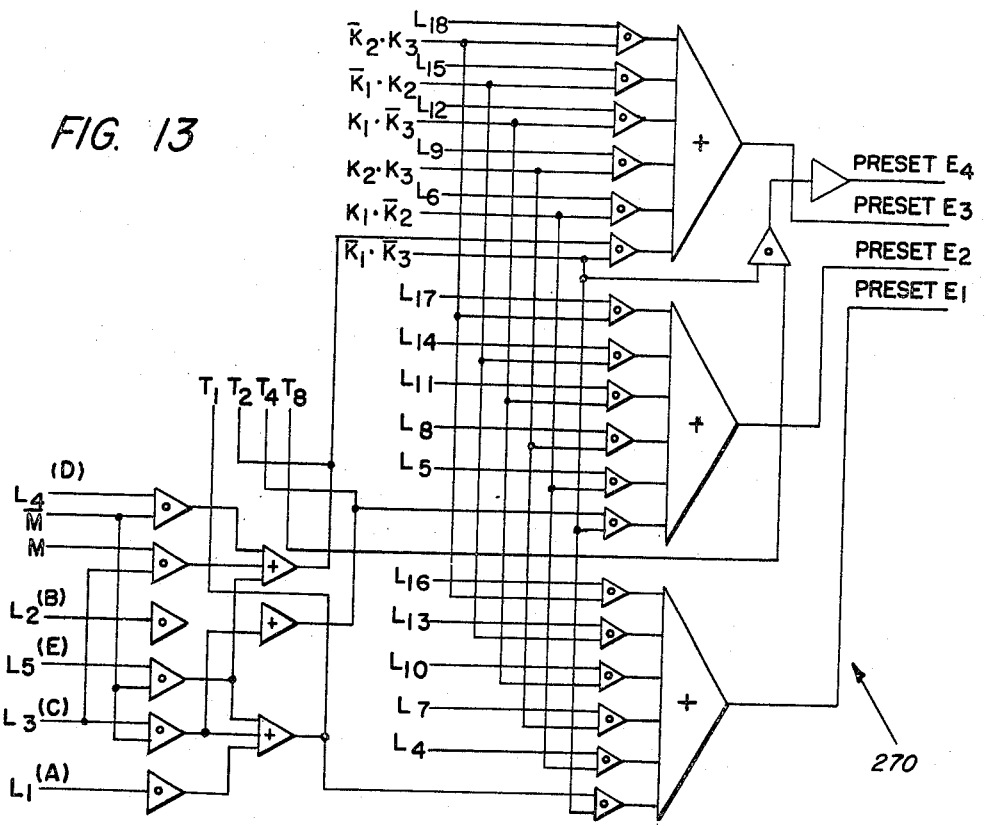

The entry logic portion 270 of the entry register 102 is shown in FIG. 13. The outputs of the entry logic portion 270 of the entry registry 102 are represented by the following equations:

$$\text{Preset } E_1 = [L_1 + (L_3 + L_5).\overline{M} + T_1]\overline{K}_1.\overline{K}_3$$
$$+ L_4.K_1.\overline{K}_2 + L_7.K_2.\overline{K}_3 + L_{10}.K_1.K_3$$
$$+ L_{13}.\overline{K}_1.K_2 + L_{16}.\overline{K}_2.K_3 \qquad (15)$$

$$\text{Preset } E_2 = (L_2 + L_3.\overline{M} + T_2)\overline{K}_1.\overline{K}_3 + L_5.K_1.\overline{K}_2$$
$$+ L_8.K_2.\overline{K}_3 + L_{11}.K_1.K_3 + L_{14}.\overline{K}_1.K_2$$
$$+ L_{17}.\overline{K}_2.K_3 \qquad (16)$$

$$\text{Preset } E_3 = [L_3.M + (L_4 + L_5)\overline{M} + T_4].\overline{K}_1.\overline{K}_3$$
$$+ L_6.K_1.\overline{K}_2 + L_9.K_2.\overline{K}_3 + L_{12}.K_1.K_3$$
$$+ L_{15}.\overline{K}_1.K_2 + L_{18}.\overline{K}_2.K_3 \qquad (17)$$

$$\text{Preset } E_4 = T_8.\overline{K}_1.\overline{K}_3 \qquad (18)$$

where $K_1$, $K_2$ and $K_3$ are the signals from the K counter 120, and $L_1$ through $L_{18}$ lines come from the student stations. M and $\overline{M}$ are the signals from the M flip-flop 118, and $T_1$, $T_2$, $T_4$, and $T_8$ are the output lines from the thumbwheel switches of the course identification switches 114 from the instructor station 10.

The entry logic 270 is used to enter into the E register 250 the response (or student identity number) from each individual student station when it is selected by the address generator 100. In the student response mode, the answers A, B, C, D or E are first encoded in a binary form and then entered into the E register 250. In the student response mode, all entries are made with the K counter 120 in the condition $\overline{K}_1 \overline{K}_3$. The K counter 120 is not allowed to advance out of this state in the student response mode. This will be discussed in greater detail in the section on the K counter 120.

Associated with the K counter 120 is a flip-flop called the M flip-flop 118. This flip-flop is set to the one or true state in the record student identity mode and is set to the zero or false state in the record student response mode. The ouputs of this M flip-flop 118 are used to control the K counter 120 and in other operations to indicate whether the mode of operation is the student response mode or the student identity mode.

Examining the Equations 15–18 above in which the K counter 120 is in state $\overline{K}_1 \overline{K}_3$ and the M flip-flop 118 is in state $\overline{M}$, under these conditions the system is in the record student response mode and the inputs $L_1$, $L_2$, $L_3$, $L_4$, and $L_5$ to the entry logic 270 will indicate the choice of response made by the particular student station currently selected by the address generator 100. Input $L_1$ corresponds to answer A, input $L_2$ corresponds to answer B, $L_3$ to C, etc. From the Equations 15–18, it can be seen that an entry will be made into the $E_1$ flip-flop 252 with either an "A" answer, a "C" answer, or an "E" answer. An entry will be made into the $E_2$ flip-flop 254 with a "B" answer or a "C" answer, and an entry will be made into the $E_3$ flip-flop 256 with a "D" answer or an "E" answer. In addition, the term $L_3.M$ is one of the alternate conditions for inserting a "1" into the $E_3$ flip-flop 256. This will be discussed later. Below is a table showing the relationship between the selected answer and the binary code inserted into the E register 250.

|   | $E_4$ | $E_3$ | $E_2$ | $E_1$ |
|---|---|---|---|---|
| A | 0 | 0 | 0 | 1 |
| B | 0 | 0 | 1 | 0 |
| C | 0 | 0 | 1 | 1 |
| D | 0 | 1 | 0 | 1 |
| E | 0 | 1 | 0 | 1 |

In the record student identity number mode (in which the M flip-flop 118 is true), the K counter 120 is allowed to count. The inputs $L_1$ through $L_{18}$ are interpreted as indicating coded student identity numbers rather than student responses. The K counter 120, which will be discussed later, has six outputs corresponding to the six possible states of the K counter 120. A specific set of input lines chosen from the inputs $L_1$ through $L_{18}$ are used to insert information into the E register 250 for each possible output of the K counter 120. In state $\overline{K}_1 K_3$, with the M flip-flop 118 true, the content of $L_1$ is entered into the $E_1$ flip-flop 252, $L_2$ is entered into the $E_2$ flip-flop 254, and $L_3$ is entered into the $E_3$ flip-flop 256. In other words, the first three bits of the student identity number are entered into the flip-flops $E_1$ through $E_3$. In the state $K_1 \overline{K}_2$, the second three bits of the student identification number are entered into the flip-flops $E_1$ through $E_3$. Similarly, for the remaining parts of the student identification number, this is indicated in the Equations 15–18. At the conclusion of entering and recording all characters of the student identification numbers the K counter 120 is allowed to return to the original state $\overline{K}_1 \overline{K}_3$. In this state, the address generator 100 is allowed once again to advance to select the next student station whose identity number is to be recorded.

Parity logic circuits

Figure 14:
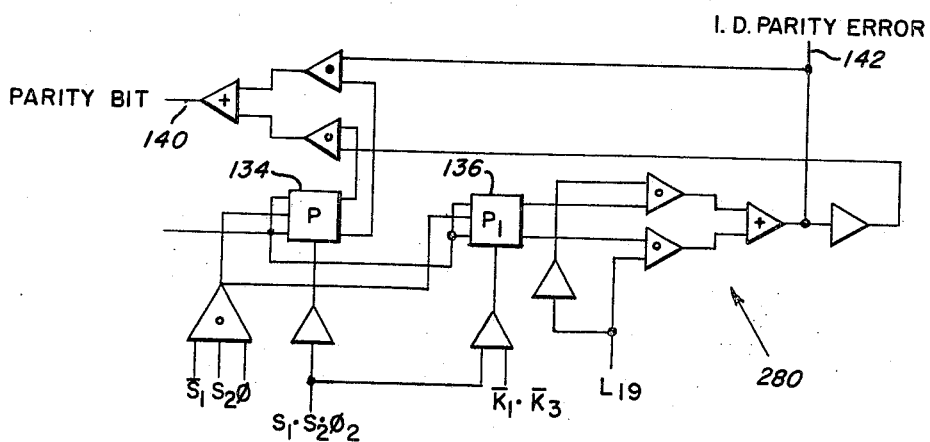

The party logic circuits 280 as shown in FIG. 14 including the P parity flip-flop 134 and the $P_1$ parity flip-flop 136. When the state counter 104 is in state $\overline{S}_1 \overline{S}_2$, the information in the E register 250 shifts in a recirculating manner through the register four places, ultimately arriving at the same position from which it started. The mechanism for accomplishing this is described under the E register section above. During the course of shifting this information through the E register 250, a flip-flop called the P flip-flop 134 is allowed to change state on every clock pulse, provided that the $E_1$ flip-flop 252 contains a "1." At this time information is initially entered into the E register 250, that is, during the state $S_1 \overline{S}_2$, the P flip-flop 134 is set to the "1" condition by means of the preset input. Now since the P flip-flop 134 is triggered or caused to change state each time a one appears in the $E_1$ flip-flop 252, the P flip-flop 134, at the conclusion of the E register shift cycle, contain a "1" if there are an even number of "1's" in the E register 250 and will contain a "0" if there are an odd number of "1's" in the E register 250. The contents of the P flip-flop 134 are recorded by the external recording device 106 at the time that the contents of the E register 250 are recorded by this same external recording device. The contents of the P flip-flop 134 are recorded via lead 140 as a parity bit providing odd parity for the entire recorded character. The $P_1$ flip-flop 136 shown in FIG. 14 is used to generate a parity bit for the complete set of six characters necessary to record one complete student identity number. The $P_1$ flip-flop 136 is allowed to count or change state each time the P flip-flop 134 changes state—that is, whenever the $E_1$ flip-flop 252 contains a "1." However, the $P_1$ flip-flop 136 is set by means of its preset input to the "1" state only on the entry of the first character of each six-character student identity number.

At the time the sixth character of a student identity number is to be recorded, the $P_1$ flip-flop 136 will contain an odd parity bit for the entire six characters. The signal from $P_1$ is compared with the contents of Line $L_{19}$ from the student station currently selected by the address generator 100. If the $P_1$ signal is identical with $L_{19}$, then no parity error is assumed to exist and the sixth character of the student identity is recorded in a normal manner. If, however, the $P_1$ signal differs from $L_{19}$, a parity error is assumed to exist for the entire student identity number. This could result from a defective student identity card or a damaged or otherwise malfunctioning student station. If a parity error occurs, then an extra bit is recorded along with the sixth character of the student identity number and, of course, the normal parity bit as generated by the P flip-flop 134 is inverted to cause correct parity for the recorded character to be preserved. The equations for the parity logic circuits are as follows:

$$\text{Preset } P = S_1 . \overline{S}_2 . \phi_2 \qquad (19)$$
$$\text{Preset } P_1 = S_1 . \overline{S}_2 . \overline{K}_1 . \overline{K}_3 . \phi_2 \qquad (20)$$
$$tP = E_1 . \overline{S}_1 . S_2 . \phi_2 \qquad (21)$$
$$tP_1 = E_1 . \overline{S}_1 . S_2 . \phi_2 \qquad (22)$$
$$\text{I.D. Parity Errors} = P_1 . \overline{L}_{19} + \overline{P}_1 . L_{19} \qquad (23)$$
$$\text{Parity Bit} = \overline{P} . (\overline{P}_1 . L_{19} + P_1 . \overline{L}_{19}) + P . (P_1 . L_{19} + \overline{P}_1 . \overline{L}_{19}) \qquad (24)$$

K counter and M flip-flop

The K counter 120 and M Flip-flop 118 circuits are illustrated in FIG. 15. The K counter 120 is a Johnson counter made up of the $K_1$, $K_2$, $K_3$ flip-flops 178, 180 and 182. There is a three-bit recirculating shift register with an inversion between the $K_3$ flip-flop 182 and the $K_1$ flip-flop 178. The possible states of the K counter 120 are shown below.

| $K_3$ | $K_2$ | $K_1$ |
|---|---|---|
| 0 | 0 | 0 |
| 0 | 0 | 1 |
| 0 | 1 | 1 |
| 1 | 1 | 1 |
| 1 | 1 | 0 |
| 1 | 0 | 0 |

Equations 25 through 33 describe the operations of the K counter 120 and M flip-flop 118.

$$rK_1 = K_3 \qquad (25)$$
$$SK_2 = K_1 \qquad (26)$$
$$rK_2 = \overline{K}_1 \qquad (27)$$
$$SK_3 = K_2 \qquad (28)$$
$$rK_3 = \overline{K}_2 \qquad (29)$$
$$\text{SHIFT CLOCK} = S_1 . S_2 . \overline{N} . R . \overline{C}_1 . \overline{C}_2 . \phi_1 \qquad (30)$$
$$SK_1 = \overline{K}_2 . \overline{K}_3 . M . \overline{A}_5 . \overline{A}_6 . \overline{A}_7 . \overline{A}_8 . \overline{A}_9 . \overline{A}_{10} . \overline{A}_{11} . \overline{A}_{12} \qquad (31)$$
$$\text{PRESET } K_1, K_2, \& K_3 =$$
$$(\overline{M} + A_5 + A_6 + A_7 + A_8 + A_9 + A_{10} + A_{11} + A_{12}) \phi_1 \qquad (32)$$
$$sM = \text{ROLL CALL BUTTON} . \phi_1 \qquad (33)$$
$$rM = N . S_1 . S_2 . \phi_1$$

In the Equation 31 for setting the $K_1$ flip-flop 178, in addition to the $\overline{K}_3$ term, a $\overline{K}_2$ term also appears. This term prevents the counter 120 from getting into either of the two unused states. Examining Equation 30 for the clock pulse which shifts the K counter 120, it can be seen that the conditions are identical to those for counting the state counter 104, with the addition of the $S_1 S_2$ term. This permits the K counter 120 to be clocked only when the state counter 104 goes from state $S_1 S_2$ into state $\overline{S}_1 \overline{S}_2$. The K counter 120 is permitted to advance on this clock only when the M flip-flop 118 is true and flips-flops $A_5$ through $A_{12}$ in the address generator 100 are true. If any of these conditions are false, then only zeros will be shifted into the $K_1$ flip-flop 178 at each clock pulse time. Examining the preset inputs to the K flip-flops, it can be seen that the same conditions—M being false or any one of the flip-flops $A_5$ through $A_{12}$ of the address generator 100 being false—will cause the K counter 120 to be reset to the zero state. In other words, the K counter 120 is not permitted to count either during the first 16 addresses generated by the address generator 100 or whenever the M flip-flop 118 indicates that the system is in the response mode rather than the identity mode. The six output states of the K counter 120 are shown at the top of FIG. 15. It will be noted that each one of these states is generated by only two output signals from the K flip-flops. This is a well known characteristic of Johnson counters and is why this method was chosen in this particular case. The six states of the K counter 120 so generated are used in the entry logic 270 as discussed in the previous section to select which of the six characters making up the student identity mode are to be entered into the E register 250.

Figure 16:
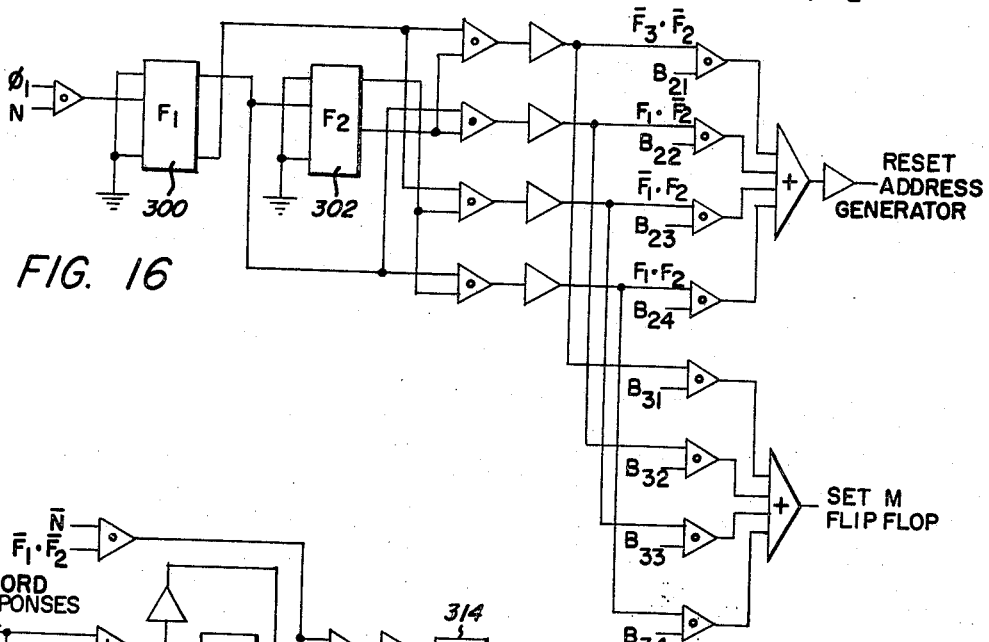

The control unit 12 can be used to serve more than one classroom at a time by means of the circuitry shown in FIG. 16. By means of this circuit, the M flip-flop 118 is set with the following conditions:

$$sM = \overline{F}_1.\overline{F}_2.B_{31} + F_1.\overline{F}_2.B_{32} + \overline{F}_1.F_2.B_{33} + F_1.F_2.B_{34}$$

where $F_1$ and $F_2$ flip-flops 300 and 302 make up an F counter 304 which is used to select among up to four classrooms, and $B_{31}$, $B_{32}$, $B_{33}$, $B_{34}$ flip-flops are part of the push button logic for each classroom. The $B_3$ refers to the push button logic and the second subscripts are used to distinguish the push button logic between different classrooms.

The two $F_1$ and $F_2$ flip-flops 300 and 302 are wired as a simple binary counter 304. This counter 304 counts on $\phi_1$ clock pulse whenever the control unit 12 is not in use, as signified by the "N" signal. Four output signals are generated by the F counter 304:

$$\overline{F}_1.\overline{F}_2, \overline{F}_1.F_2, F_1.\overline{F}_2, \text{ and } F_1.F_2,$$

corresponding to the four possible states of the F counter 304. Each output signal is used to select one classroom out of a total of four possible classrooms. (The F counter 304 could, of course, be expanded to handle more classrooms.) If the button is pushed in the instructor's station of one of the classrooms, say the classroom corresponding to state $\overline{F}_1 \overline{F}_2$ of the counter 304 then when the F counter 304 counts to $\overline{F}_1 \overline{F}_2$, the push-button circuitry for the classroom will be activated, causing the address generator 100 to be reset to the "0" state and, in the process, locking the F counter 304 in the previously selected state. This comes about because in the process of resetting the address generator 100, the N signal is caused to go false, thereby inhibiting the F counter 304.

Push button logic

Figure 17:
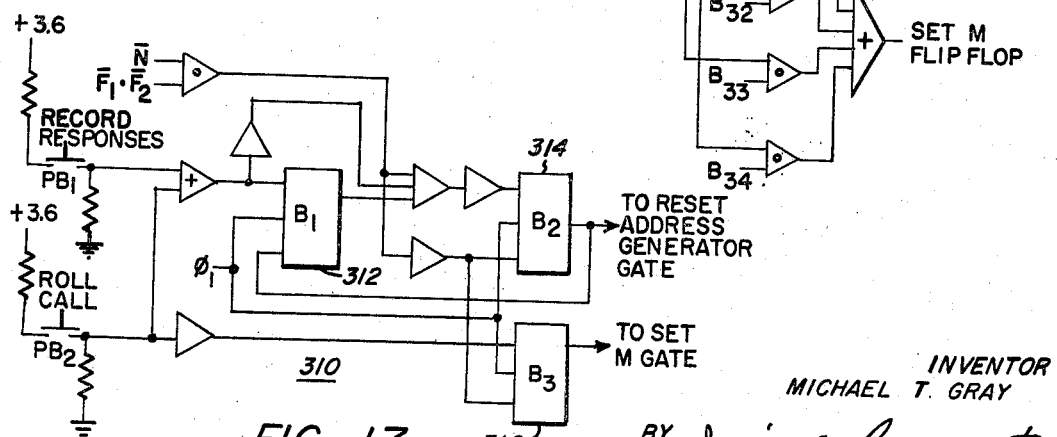

The push button logic 310 shown in FIG. 17 is duplicated for each classroom to be used. The equations pertinent to the push button logic 310 are:

$$SB_1 = (PB + PB_2).\phi_1 \quad (34)$$
$$rB_1 = B_2.\phi_1 \quad (35)$$
$$SB_2 = B_1.\overline{BP}_1.\overline{PB}_2.(N + \overline{F}_1.\overline{F}_2^*).\phi_1 \quad (36)$$
$$rB_2 = \overline{N}.\overline{F}_1.\overline{F}_2^*.\phi_1 \quad (37)$$
$$SB_3 = PB_1.\phi_1 \quad (38)$$
$$rB_3 = \overline{N}.\overline{F}_1.\overline{F}_2^*.\phi_1 \quad (39)$$

The term $\overline{F}_1.\overline{F}_2$ would be different for each classroom, e.g. $\overline{F}_1 \overline{F}_2$, $\overline{F}_1 F_2$ or $F_1.F_2$. When either the roll call or response buttons 18 or 19 are pushed, the $B_1$ flip-flop 312 will be set by a $\phi_1$ clock. When the selected button is released, unless the control unit 12 is in mid-cycle for that particular auditorium, then the $B_2$ flip-flop 314 will be set by a $\phi_1$ clock pulse. In other words, the $B_2$ flip-flop 314 will be set only when a push button has been pushed and then released. The $B_1$ flip-flop 312 will be reset on the first $\phi_2$ clock pulse following the setting of the $B_2$ flip-flop 314. When the F counter 304 in FIG. 16 counts to the state corresponding to this particular lectern or classroom, a $\phi_2$ clock pulse will be enabled by the combination of the $B_2$ flip-flop 314 being true and the F counter 304 being in the corresponding state, to reset the address generator 100. The address generator 100 being reset makes the N signal go false, thereby preventing the F counter 304 from advancing further. The absence of the N signal, together with the output of the F counter 304, now causes the $B_2$ flip-flop 314 to be reset on the next $\phi_1$ clock pulse. This will prevent the address generator 100 from being reset more than once. There exists a $B_3$ flip-flop 316 which is set by the roll call button 18 but not the response button 19. The output of the $B_3$ flip-flop 316 is gated by the F counter 304 in the same manner the $B_2$ flip-flop 314 was gated by the F counter 304 in order to set the M flip-flop 118 in cases where the roll call or student identity mode is to be used. The same circuitry, that is the push buttons 18 and 19 and the $B_1$ $B_2$, $B_3$ flip-flops 312, 314 and 316 and associated gates, is repeated for each classroom up to a maximum of four classrooms. The output of the F counter 304, in addition to activating the push button circuitry in each classroom is also used as part of the addressing for each student station within the selected classroom. In other words, the F counter 304 is treated as though it were an extension of the address generator 100.

Classroom identification switches

Figure 18:
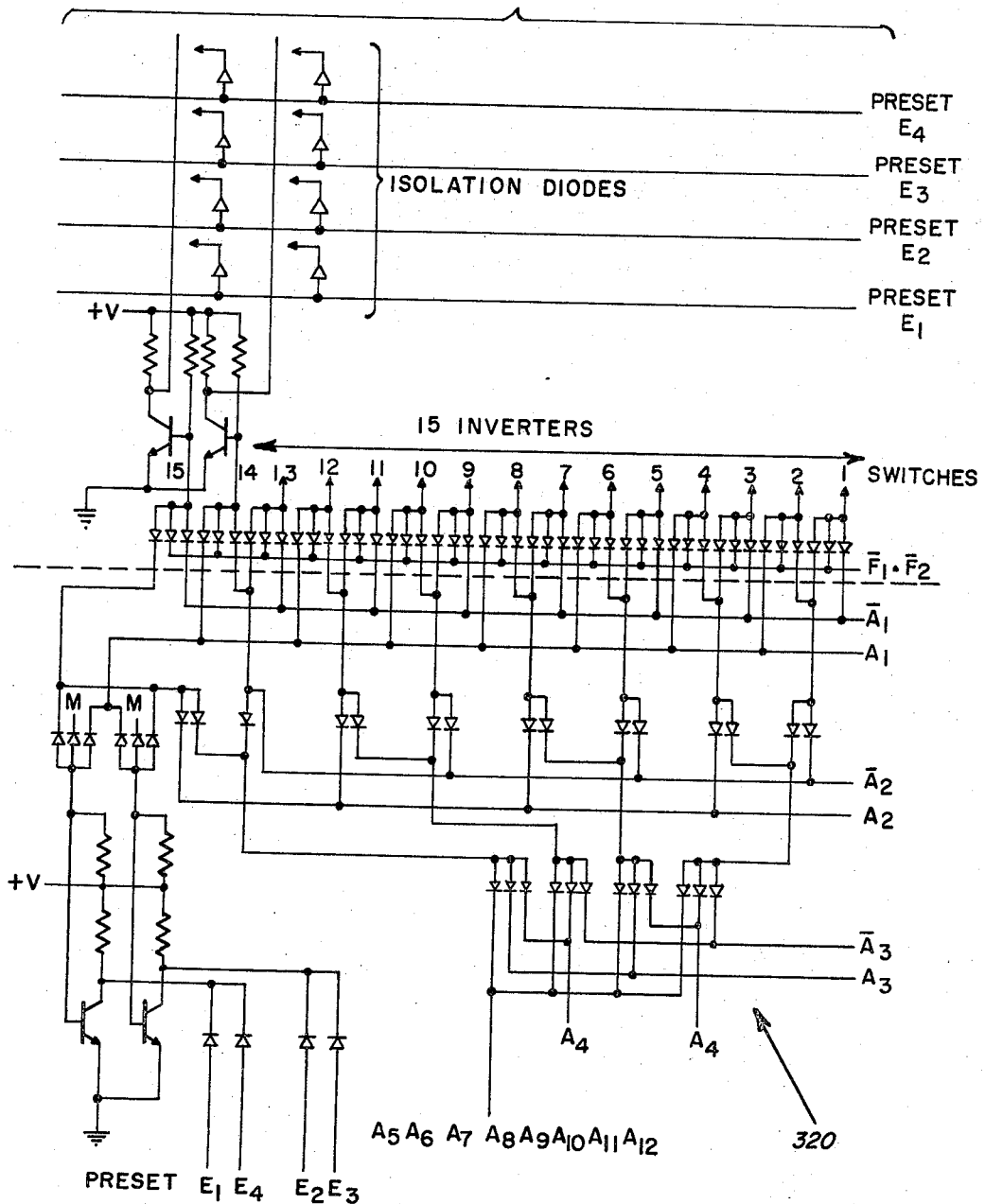

Each lectern or instructor's station has in addition to the two record buttons 18 and 19 (roll call or response) a set of thumb wheel switches or similar mechanisms labeled 114 in FIG. 8 and shown as switches 20 in FIG. 2 for entering classroom identification information. The first 16 addresses from the address generator 100 are reserved for this classroom identification information. In other words, each switch is treated as though it were a student station. As each switch is selected by the address generator 100, a binary output corresponding to the position of the switch is impressed upon the entry logic 270 to be entered in the $E_1$–$E_4$ flip-flop, 252, 254, 256 and 258 of the E register 250. The selection of the thumb wheel switches is performed with a simple diode tree selection matrix 320 as shown in FIG. 18. The circuitry above the broken line is located in each lectern or instructor's station and the circuitry below the broken line is common to all the lecterns making up the system and is located in the control unit 12.

The select switch $$1 = \overline{A}_1.\overline{A}_2.\overline{A}_3.\overline{A}_4.\overline{A}_5.\overline{A}_6.\overline{A}_7.\overline{A}_8.\overline{A}_9.\overline{A}_{10}.\overline{A}_{11}.\overline{A}_{12}$$

and G represents $\overline{A}_5.\overline{A}_6.\overline{A}_7.\overline{A}_8.\overline{A}_9.\overline{A}_{10}.\overline{A}_{11}.\overline{A}_{12}$. Then the thumbwheel switches are selected as follows:

| Selected switch | $A_1$ | $A_2$ | $A_3$ | $A_4$ | G |
|---|---|---|---|---|---|
| 1 | 0 | 0 | 0 | 0 | 1 |
| 2 | 1 | 0 | 0 | 0 | 1 |
| 3 | 0 | 1 | 0 | 0 | 1 |
| 4 | 1 | 1 | 0 | 0 | 1 |
| 5 | 0 | 0 | 1 | 0 | 1 |
| 6 | 1 | 0 | 1 | 0 | 1 |
| 7 | 0 | 1 | 1 | 0 | 1 |
| 8 | 1 | 1 | 1 | 0 | 1 |
| 9 | 0 | 0 | 0 | 1 | 1 |
| 10 | 1 | 0 | 0 | 1 | 1 |
| 11 | 0 | 1 | 0 | 1 | 1 |
| 12 | 1 | 1 | 0 | 1 | 1 |
| 13 | 0 | 0 | 1 | 1 | 1 |
| 14 | 1 | 0 | 1 | 1 | 1 |
| 15 | 0 | 1 | 1 | 1 | 1 |

The term $\overline{F}_1.\overline{F}_2$ has been included in FIG. 18 to show the selection of a typical set of thumbwheel switches. This term would of course be different for each of the four possible sets.

The 16th character is not encoded by a thumbwheel switch but rather by the M flip-flop 118. This character is a format character and is used to identify the recorded information immediately following as either a set of student responses or a set of student identification numbers.

The equations for the format character are:

Preset $E_1$ and $E_4$ on $A_1.A_2.A_3.A_4.G.M$ (40)
Preset $E_2$ and $E_3$ on $A_1.A_2.A_3.A_4.G.\overline{M}$ (41)

Obviously many modifications and variations of the present invention are possible in the light of the above teachings. It is therefore to be understood that within the scope of the appended claims the invention may be practiced otherwise than as specifically described.

I claim:
1. A teaching system comprising:
a plurality of means with each of which an individual student may be associated, each of said means provided for initiating the student's responses to questions presented and for identifying the student with a unique identification code, the student's responses and identification being performed independently of the particular means with which the student may be associated, and
control means responsive to the student's actuation of said plurality of means to record the presence, identity, and responses of the student, said control means being independent of the relationship between any one of said plurality of means and said identification code.

2. A teaching system as set forth in claim 1 wherein said plurality of means comprises student response stations, each said station capable of receiving the code for identifying the student associated with the station and of initiating that student's responses to questions.

3. A teaching system as set forth in claim 1 wherein said control means includes an instructor's station which includes means for allowing student identification information to be derived from said plurality of means, after actuation of said plurality of means by said students in a roll call mode, means for allowing student responses to questions having multiple answer categories to be derived from said plurality of means after actuation of said plurality of means by said students in a response mode and a plurality of indicating devices for displaying the percentage of student responses initiated by said plurality of means in each answer category.

4. A teaching system as set forth in claim 1 wherein said control means includes means for recording the student identification and response information, means for placing the system in roll call and response modes of operation and means for storing the identification and response information while awaiting recordation by said recording means.

5. A teaching system which comprises:
a plurality of student response stations with each of which an individual student may be associated, each of said means provided for initiating the student's responses to questions presented and for identifying the student with a unique identification code, the student's responses and identification being performed independently of the particular response station with which the student may be associated; and
control means responsive to the student's actuation of said stations to record the presence, identity, and responses of the students, said control means including means for initiating roll call and response modes of operation of said stations, means for storing the identity and responses of each of said students, and means for recording the identity and responses of each of said students, said control means being independent of the relationship between any one of said stations and any student's identification code.

6. A teaching system as set forth in claim 5 wherein each of said student response stations includes means for providing an automatic identification of the student using the station independently of the particular station being used and means for initiating responses by the student using the station.

7. A teaching system as set forth in claim 5 wherein said control means includes an instructor's station which includes means for allowing student identification information to be derived from each of said student response stations after actuation of said stations by the students in the roll call mode, means for allowing student responses to questions having multiple answer categories to be derived from each of said student response stations after actuation of said stations by the students in the response mode, and a plurality of indication meters for displaying the percentage of student responses initiated at said stations during the response mode in each answer category.

8. A teaching system as set forth in claim 5 wherein said control means includes an address generator for providing the roll call operation mode, a state counter for determining the state of and controlling the roll call and response modes of operation at any instant of time, and an entry register for entering the identity and responses of each student for recording by said recording means.

9. A teaching system comprising:
a plurality of student response stations with each of which an individual student may be associated, each of said means provided for initiating the student's responses to questions presented and for identifying the student with a unique identification code, the student's responses and identification being performed independently of the particular response station with which the student may be associated;
each of said student response stations includes means for providing an identification of the student using the station independently of the particular station being used;
each of said student response stations further includes means for initiating student responses to questions presented to the student using the station; and
control means respective to the student's actuation of said stations to record the presence, identity and responses of each of the students, said control means including:
means for initiating roll call and response modes of operation of said stations, said means including an address generator for providing the roll call operation mode and a state counter for determining the state of and controlling the roll call and response modes of operation at any instant of time;
means for storing the identity and responses of each of said students;
means for recording the identity and responses of each of said students, said means including an entry register for entering the identity and responses of each student for recording by said recording means; and
an instructor's station which includes means for allowing student identification information to be derived from each of said student response stations after actuation of said stations by the student in the roll call mode, means for allowing student responses to questions having multiple answer categories to be derived from each of said student response stations after actuation of said stations by the students in the response mode, and a plurality of indication meters for displaying the percentage of student responses initiate at said stations during the response mode in each answer category.

10. An electrically actuated student response station for employment in a teaching system having a plurality of said stations, said system including a coded identification means for identifying a student using the station, said station comprising:
means included in said station for receiving and electrically connecting with said coded identification means for providing an identification of the student using said station independently of the particular station being used; and
means included in said station for electrically initiating responses to questions presented to the student using said station.

11. A student response station as set forth in claim 10 wherein:
said identification means comprises an adapter for receiving said student identification coded means whereby when said coded means is inserted in said adapter, the student using the station may be identified; and
said response initiating means includes a plurality of members each representing a possible answer whereby when one of said members is selected the answer corresponding thereto becomes a response from said station.

12. A student response station as set forth in claim 11 wherein: said adapter comprises an electrical connector for receiving said student identification coded device.

13. A student response station as set forth in claim 11 wherein: said plurality of members comprise response buttons each of which when depressed provides a response representative of a particular answer to a question asked the student.

14. A student response station as set forth in claim 11 wherein:
said plurality of members comprise selection positions each of which represents a different response to the question asked the student; and
a slide member movable in a slot to allow the positioning of said slide member next to the chosen selection position to initiate the student's response.

15. A student response station as set forth in claim 11 wherein:
said plurality of members comprise selection positions each of which represents a different response to the question asked the student; and
a rotatable member having an opening therein to allow the positioning of said rotatable member so that the chosen selection position is visibly exposed in the opening in said rotatable member.

16. A student response station circuit for employment in a student response station of a teaching system having a plurality of response stations, said circuit comprising:
input and output means;
means for selecting a mode of operation between a response mode and an identification mode connected to said input means,
means for receiving a student identification coded device connected to said output means;
means for initiating responses to questions presented to the student coupled between said input and output means;
means coupled between said mode selecting means and said identification device receiving means for energizing the identification device receiving means to generate student identification information at the output means of said circuit, said identification information being a unique, coded number associated with each student independently of any particular station being used, said identification energizing means being independent of the relationship between any one of said response stations and a student's identification number; and
means connected between said mode selection means and said identification energizing means for energizing the response initiation means so responses to questions presented to the student may appear at the output of said circuit.

17. A student response station circuit as set forth in claim 16 wherein: said mode selecting means is a diode connected to said input means.

18. A student response station circuit as set forth in claim 16 wherein:
said identification device receiving means is an electrical connector for receiving a student identification coded device, and
said response initiating means are a plurality of response switches each of which corresponds to a different response.

19. A student response station circuit as set forth in claim 16 wherein: said identification energizing means and response energizing means are transistor circuits, said identification energizing circuit being energized while said response energizing circuit is off and said identification energizing circuit being off while said response energizing circuit is on.

20. A student response station circuit for employment in a student response station of a teaching system having a plurality of response stations, said circuit comprising:
input and output means;
a mode selecting diode for selecting between a response mode and an identification mode, said diode connected to said input means;
an electrical connector for receiving a student identification coded device connected to said output means;
a plurality of response switches for initiating different responses to questions asked a student by an instructor, said switches coupled between said input and output means;
one transistor circuit for energizing said electrical connector to generate student identification information at said output means, said identification information being a unique coded number associated with each student independently of any particular station being used, said one transistor circuit being independent of the relationship between any one of said response stations and a student's identification number, said transistor circuit coupled between said mode selection diode and said electrical connector; and
another transistor circuit for energizing said response switch so that student responses may appear at said output means, said another transistor circuit is connected between said mode selection diode and said one transistor circuit;
said one transistor circuit being energized to generate identification information at said output means while said another transistor circuit is off and said one transistor circuit being off while said another transistor circuit is energized to permit student responses at said output means, said responses being initiated by said response switches.

21. A control unit for employment in a teaching system including a plurality of student response stations, said control unit having identification information and response states of operation and comprising:
means for deriving from said response stations student identification information and responses to questions in a prescribed sequence through the identification and response states, said identification information being a unique coded number associated with each student independently of any particular station being used, said means responsive to actuation of said response stations to record the presence, identity and responses of a plurality of students, said means being independent of the relationship between any one of said response stations and a student's identification number;
means connected to said deriving means for determining the state of the prescribed sequence; and
means connected to said information and response deriving means and to said state determining means for entering the student identification information and student responses for recording by a recording means.

22. A control unit as set forth in claim 21 wherein: said information deriving means is an address generator comprising logic circuits including a plurality of flip flops for deriving student separate and unique identification numbers corresponding to each of the students using the system.

23. A control unit as set forth in claim 21 wherein: said state determining means is a state counter for determining the state of and controlling the student identification and response states of operation.

24. A control unit as set forth in claim 21 wherein: said information entering means is an entry register which enters student identification numbers provided by said identification information deriving means and student responses for recording by a recording means.

25. A control unit for employment in a teaching system including a plurality of student response stations, said control unit having identification and response states of operation and comprising:

an address generator comprising logic circuits for deriving from said response stations student separate and unique identification numbers corresponding to each of the students using the system independently of any particular station being used, said address generator being independent of the relationship between any one of said response stations and a student's identification number;

a state counter connected to the address generator; and an entry register connected to the state counter and the address generator;

said entry register entering the student identification numbers generated by said address generator and entering student responses for recording by a recording means connected to the entry register;

said state counter determining the state of and controlling the sequence of said address generator and said entry register.

26. An instructor's station for employment in a teaching system including a plurality of student response stations, said instructor's station permitting student identification and response operations to be initiated by said system, said instructor's station being mounted on a lectern and comprising:

circuit means included in said lectern for turning said station on and off;

circuit means included in said lectern for initiating a student identification operation, said student identification being provided by a separate and unique coded number associated with each student independently of any particular student station being used, said student identification initiating circuit means being independent of any relationship between any one of said student response stations and a student's identification number;

circuit means included in said lectern for initiating a student response operation whereby student's responses to questions presented which have multiple answer categories are recorded;

circuit means included in said lectern for automatically initiating the recording of course identification information; and circuit means included in said lectern for indicating percentages of student responses to each question in each answer category during the student response operation.

27. In a response system having a plurality of response stations, each of said stations having means for receiving a respondent's identification device in order to initiate an identification operation for identifying the respondents using each of said stations with a corresponding identification code, wherein said identification device comprises: a member having a plurality of electrical connectors containing a separate and unique identification code corresponding to a respondent, said member being engageable with any one of said response stations in order to identify the respondent using said station whereby any respondent can be identified independently of any particular station being used.

28. In a response system having a respondent's identification device as set forth in claim 27 wherein:

said member is a card having a plurality of conductive electrical connectors attached thereto;

each of said connectors containing coded information corresponding to one digit of a respondent's identification number;

said connectors being electrically engageable with an electrical circuit in said response stations so as to transfer the respondent's identification number encoded on the connectors into the system in order to identify the respondent using the system.

29. In a system having a plurality of stations, each of said stations having means for receiving an individual's identification device in order to initiate an identification operation for identifying the individuals using each of said stations with a corresponding identification code, wherein said identification device comprises: a member having a plurality of electrical connectors containing a separate and unique identification code corresponding to an individual, said member being engageable with any one of said stations in order to identify the individual using said station whereby any individual can be identified independently of any particular station being used.

30. A teaching system comprising:

a plurality of student stations each provided with first means actuable by a student for initiating the student's responses to questions presented, each of said stations further having second means responsive to a unique identification code associated with any one of said students, said second means actuable by said student for initiation of the recordation of the presence and identity of said student, and third means responsive to said student actuation of said first and second means to record the presence, identity and responses of a plurality of students, said third means being independent of the relationship between any one of said student actuable means and said identification code.

31. A response system comprising:

a plurality of first means each provided with response means actuable by an individual for initiating the individual's responses to questions presented, each of said first means further having identification means responsive to a unique identification code associated with any one of said individuals, said identification means actuable by said individual for initiation of the recordation of the presence and identity of said individual, and second means responsive to said individual's actuation of said response and identification means to record the presence, identity and responses of a plurality of individuals, said second means being independent of the relationship between any one of said individual actuable means and said identification code.

References Cited

UNITED STATES PATENTS

| | | | |
|---|---|---|---|
| 3,186,109 | 6/1965 | Brinton | 35—9 |
| 3,186,110 | 6/1965 | Smyth | 35—11 |
| 3,190,014 | 6/1965 | Rhodes | 35—9 |
| 3,199,230 | 8/1965 | Sylvester et al. | 35—9 |
| 3,266,174 | 8/1966 | Bechtol et al. | 35—11 |
| 3,270,438 | 9/1966 | Ephraim | 35—48 |
| 3,299,254 | 1/1967 | Dobbins et al. | 35—9 |
| 3,300,876 | 1/1967 | Johannsen | 35—9 |
| 3,303,472 | 2/1967 | Chalker et al. | 340—172.5 |
| 3,314,172 | 4/1967 | Boyett | 35—48 |
| 3,344,408 | 9/1967 | Singer et al. | 340—172.5 |

EUGENE R. CAPOZIO, Primary Examiner

WALTER W. NIELSEN, Assistant Examiner